(12) United States Patent
Alves et al.

(10) Patent No.: US 11,287,595 B2
(45) Date of Patent: Mar. 29, 2022

(54) FIBER OPTIC DEAD-END CABLE CLAMP WITH CENTRAL ACTUATOR

(71) Applicant: Hubbell Incorporated, Shelton, CT (US)

(72) Inventors: Nicole Leigh Alves, Fall River, MA (US); Rabih M. Al Ghossein, Hoover, AL (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 16/700,036

(22) Filed: Dec. 2, 2019

(65) Prior Publication Data

US 2020/0174214 A1 Jun. 4, 2020

Related U.S. Application Data

(60) Provisional application No. 62/775,193, filed on Dec. 4, 2018.

(51) Int. Cl.
*G02B 6/44* (2006.01)

(52) U.S. Cl.
CPC .................. *G02B 6/4471* (2013.01)

(58) Field of Classification Search
CPC ......... G02B 6/4471; G02B 6/483; G02B 6/06
See application file for complete search history.

(56) References Cited

U.S. PATENT DOCUMENTS

| | | | |
|---|---|---|---|
| 1,080,472 A | 12/1913 | Parker et al. | |
| 1,504,087 A | 8/1924 | Brady | |
| 2,146,575 A | 2/1939 | Heffner | |
| 2,220,203 A | 11/1940 | Branin | |
| 3,071,831 A | 1/1963 | Chickvary | |
| 3,999,427 A * | 12/1976 | Decker | G01L 1/2218 73/862.381 |
| 4,168,109 A * | 9/1979 | Dumire | G02B 6/3825 385/60 |
| 4,183,686 A | 1/1980 | De France | |

(Continued)

OTHER PUBLICATIONS

International Search Report and Written Opinion mailed in corresponding International Application PCT/US19/63937 dated Jan. 28, 2020 (10 pages).

(Continued)

*Primary Examiner* — Andrew Jordan
(74) *Attorney, Agent, or Firm* — Wissing Miller LLP

(57) ABSTRACT

A clamp assembly includes a body having a jaw receiving cavity. A jaw actuator assembly is positioned within the jaw receiving cavity. A first jaw member is positioned within a first jaw guide associated with the body and the jaw receiving cavity and is operatively coupled to the jaw actuator assembly. A second jaw member is positioned within a second jaw guide associated with the body and the jaw receiving cavity and is operatively coupled to the jaw actuator assembly. The first and second jaw members are movable within the jaw receiving cavity between a loading position and a clamping position. The jaw actuator assembly moves the jaw members from the loading position and the clamping position. The clamp assembly applies sufficient clamping or gripping force on the fiber optic cable to hold the fiber optic cable without degrading or damaging the fiber optic cable resulting in signal loss.

21 Claims, 13 Drawing Sheets

(56) References Cited

U.S. PATENT DOCUMENTS

| | | | | |
|---|---|---|---|---|
| 4,205,896 A * | 6/1980 | Borsuk | ............... | G02B 6/3843 |
| | | | | 385/84 |
| 4,225,214 A * | 9/1980 | Hodge | ............... | G02B 6/3841 |
| | | | | 385/136 |
| 4,247,163 A * | 1/1981 | Lumpp | ............... | G02B 6/3855 |
| | | | | 24/115 G |
| 4,258,566 A * | 3/1981 | Decker | ............... | G01L 5/04 |
| | | | | 73/862.381 |
| 4,336,977 A * | 6/1982 | Monaghan | ............... | G02B 6/3887 |
| | | | | 174/84 C |
| 4,355,862 A * | 10/1982 | Kock | ............... | G02B 6/3855 |
| | | | | 385/81 |
| 4,395,089 A * | 7/1983 | McKee | ............... | G02B 6/3855 |
| | | | | 385/136 |
| 4,407,471 A | 10/1983 | Wilmsmann et al. | | |
| 4,413,880 A * | 11/1983 | Forrest | ............... | G02B 6/4292 |
| | | | | 385/78 |
| 4,428,100 A | 1/1984 | Ftpperson | | |
| 4,447,120 A * | 5/1984 | Borsuk | ............... | G02B 6/4471 |
| | | | | 385/136 |
| 4,448,483 A * | 5/1984 | Ryley, Jr. | ............... | G02B 6/382 |
| | | | | 385/59 |
| 4,496,212 A * | 1/1985 | Harvey | ............... | H02G 7/056 |
| | | | | 385/136 |
| 4,529,266 A * | 7/1985 | Delebecque | ............... | G02B 6/3801 |
| | | | | 29/868 |
| 4,614,395 A * | 9/1986 | Peers-Trevarton | ............... | |
| | | | | A61N 1/3752 |
| | | | | 29/881 |
| 4,740,174 A * | 4/1988 | Annas | ............... | G02B 6/4439 |
| | | | | 439/359 |
| 4,741,704 A * | 5/1988 | DeLuca | ............... | H01R 11/22 |
| | | | | 439/477 |
| 4,770,491 A | 9/1988 | Champa et al. | | |
| 4,991,928 A * | 2/1991 | Zimmer | ............... | G02B 6/4439 |
| | | | | 385/137 |
| 5,022,125 A | 6/1991 | Biass | | |
| 5,044,719 A * | 9/1991 | Nakamura | ............... | G02B 6/3887 |
| | | | | 385/76 |
| 5,062,683 A * | 11/1991 | Grois | ............... | G02B 6/3887 |
| | | | | 385/87 |
| 5,127,135 A * | 7/1992 | Mann | ............... | G02B 6/4465 |
| | | | | 24/135 R |
| 5,157,814 A * | 10/1992 | Mann | ............... | G02B 6/4465 |
| | | | | 24/135 R |
| 5,166,997 A * | 11/1992 | Norland | ............... | G02B 6/3887 |
| | | | | 385/87 |
| 5,185,839 A * | 2/1993 | Newell | ............... | G02B 6/2804 |
| | | | | 385/139 |
| 5,214,731 A * | 5/1993 | Chang | ............... | G02B 6/3849 |
| | | | | 385/65 |
| 5,243,739 A * | 9/1993 | Schmidt | ............... | F16G 11/046 |
| | | | | 24/135 R |
| 5,271,591 A * | 12/1993 | Pittella | ............... | F16B 12/20 |
| | | | | 248/250 |
| 5,358,206 A | 10/1994 | Pittella | | |
| 5,369,849 A | 12/1994 | De France | | |
| 5,539,961 A | 7/1996 | De France | | |
| 5,615,965 A | 4/1997 | Saurat et al. | | |
| 5,647,046 A | 7/1997 | Cowen et al. | | |
| 5,758,005 A | 5/1998 | Yoshida | | |
| 5,793,920 A * | 8/1998 | Wilkins | ............... | G02B 6/4446 |
| | | | | 385/135 |
| 6,011,218 A * | 1/2000 | Burek | ............... | G02B 6/4419 |
| | | | | 174/135 |
| 6,023,549 A | 2/2000 | Polidori | ............... | G02B 6/4422 |
| | | | | 385/134 |
| 6,076,236 A | 6/2000 | De France | | |
| 6,173,104 B1 | 1/2001 | Polidori | | |
| 6,340,250 B1 * | 1/2002 | Auclair | ............... | G02B 6/4477 |
| | | | | 385/87 |
| 6,389,213 B1 | 5/2002 | Quesnel | | |
| 6,547,481 B2 | 4/2003 | Grabenstetter et al. | | |
| 6,584,269 B1 * | 6/2003 | Mitchell | ............... | G01N 3/04 |
| | | | | 242/920 |
| 6,585,425 B2 * | 7/2003 | Iwamoto | ............... | G02B 6/3897 |
| | | | | 385/25 |
| 6,591,055 B1 * | 7/2003 | Eslambolchi | ............... | G02B 6/2558 |
| | | | | 385/136 |
| 6,595,472 B1 * | 7/2003 | Pisczak | ............... | G02B 6/483 |
| | | | | 248/74.1 |
| 6,598,497 B1 * | 7/2003 | Mizushima | ............... | G02B 6/245 |
| | | | | 81/9.41 |
| 6,681,600 B1 * | 1/2004 | Mitchell | ............... | G02B 6/245 |
| | | | | 156/345.11 |
| 6,710,251 B2 * | 3/2004 | Auclair | ............... | G02B 6/46 |
| | | | | 174/74 R |
| 6,754,416 B1 * | 6/2004 | Mitchell | ............... | G02B 6/02123 |
| | | | | 385/123 |
| 6,796,854 B2 | 9/2004 | Mello et al. | | |
| 6,817,909 B2 | 11/2004 | Dobrinkski et al. | | |
| 6,957,807 B2 | 10/2005 | Zimmer et al. | | |
| 6,979,236 B1 * | 12/2005 | Stanton | ............... | H01R 4/5091 |
| | | | | 439/783 |
| 7,039,988 B2 | 5/2006 | De France | | |
| 7,304,243 B2 | 12/2007 | Polidori | | |
| 7,603,020 B1 * | 10/2009 | Wakileh | ............... | G02B 6/4477 |
| | | | | 385/134 |
| 7,787,740 B2 * | 8/2010 | Kluwe | ............... | G02B 6/4477 |
| | | | | 385/137 |
| 7,789,547 B2 * | 9/2010 | Holder | ............... | G02B 6/0008 |
| | | | | 362/581 |
| 7,837,396 B2 * | 11/2010 | Marcouiller | ............... | G02B 6/4475 |
| | | | | 385/84 |
| 7,891,060 B2 | 2/2011 | Ross et al. | | |
| 8,001,686 B2 * | 8/2011 | Swindell | ............... | G02B 6/483 |
| | | | | 29/869 |
| 8,023,793 B2 * | 9/2011 | Kowalczyk | ............... | G02B 6/4471 |
| | | | | 385/136 |
| 8,032,001 B2 * | 10/2011 | Mullaney | ............... | G02B 6/4477 |
| | | | | 385/135 |
| 8,090,234 B2 * | 1/2012 | Marcouiller | ............... | G02B 6/4471 |
| | | | | 385/136 |
| 8,249,412 B2 * | 8/2012 | Quesnel | ............... | F16G 11/101 |
| | | | | 385/137 |
| 8,317,410 B2 * | 11/2012 | Marcouiller | ............... | G02B 6/4475 |
| | | | | 385/84 |
| 8,336,684 B2 | 12/2012 | Bantle et al. | | |
| 8,341,829 B2 * | 1/2013 | Swindell | ............... | G02B 6/483 |
| | | | | 29/748 |
| 8,364,000 B2 * | 1/2013 | Gonzalez | ............... | G02B 6/4477 |
| | | | | 385/137 |
| 8,369,679 B2 * | 2/2013 | Wakileh | ............... | G02B 6/4477 |
| | | | | 385/147 |
| 8,475,219 B2 * | 7/2013 | Crutcher | ............... | G01R 15/142 |
| | | | | 439/783 |
| 8,620,128 B2 * | 12/2013 | Holmberg | ............... | G02B 6/4471 |
| | | | | 385/135 |
| 8,648,258 B2 * | 2/2014 | Drouard | ............... | H02G 15/007 |
| | | | | 174/152 G |
| 8,903,216 B2 * | 12/2014 | Thompson | ............... | G02B 6/4477 |
| | | | | 385/136 |
| 8,984,722 B2 | 3/2015 | Shibilia | | |
| 9,279,945 B2 * | 3/2016 | McColloch | ............... | G02B 6/3885 |
| 9,465,180 B2 * | 10/2016 | Marmon | ............... | G02B 6/44 |
| 9,534,707 B2 * | 1/2017 | Sakmar | ............... | G02B 6/4478 |
| 9,612,418 B1 * | 4/2017 | Lish | ............... | G02B 6/48 |
| 9,645,343 B2 * | 5/2017 | Miller | ............... | H02G 7/053 |
| 9,664,308 B2 * | 5/2017 | Sakmar | ............... | G02B 6/483 |
| 9,719,614 B2 * | 8/2017 | Blaser | ............... | F16L 5/02 |
| 9,746,633 B2 * | 8/2017 | Segsworth | ............... | G01V 1/18 |
| 9,829,656 B2 * | 11/2017 | Saito | ............... | G02B 6/387 |
| 9,891,401 B2 * | 2/2018 | Thigpen | ............... | G02B 6/48 |
| 9,929,555 B2 | 3/2018 | Shibilia et al. | | |
| 10,036,860 B2 * | 7/2018 | Saito | ............... | G02B 6/3846 |
| 10,095,001 B2 * | 10/2018 | Sakmar | ............... | H02G 1/04 |
| 10,153,626 B2 * | 12/2018 | Berg | ............... | H02G 9/02 |
| 10,184,591 B2 * | 1/2019 | Sakmar | ............... | F16L 3/1041 |
| 10,338,335 B2 * | 7/2019 | Miller | ............... | G02B 6/4478 |

(56) References Cited

U.S. PATENT DOCUMENTS

| | | | |
|---|---|---|---|
| 10,352,110 B2* | 7/2019 | Olin | E21B 17/1035 |
| 10,371,901 B2* | 8/2019 | Kaplan | G02B 6/3887 |
| 10,481,360 B2* | 11/2019 | Alston | G02B 6/4488 |
| 10,488,597 B2* | 11/2019 | Parikh | G02B 6/3809 |
| 10,514,520 B2* | 12/2019 | Petersen | G02B 6/4472 |
| 10,557,568 B2* | 2/2020 | Jones | G02B 6/4471 |
| 10,649,169 B2* | 5/2020 | Al Ghossein | H02G 7/08 |
| 10,678,014 B2* | 6/2020 | Miller | G02B 6/4478 |
| 10,705,301 B2* | 7/2020 | Al Ghossein | G02B 6/4471 |
| 10,795,108 B2* | 10/2020 | Al Ghossein | G02B 6/4471 |
| 2002/0106239 A1* | 8/2002 | Grabenstetter | H02G 7/056 403/374.2 |
| 2002/0159713 A1* | 10/2002 | Cheng | G02B 6/3855 385/70 |
| 2002/0173206 A1 | 11/2002 | Dobrinski | |
| 2002/0176674 A1* | 11/2002 | Auclair | G02B 6/46 385/101 |
| 2003/0002840 A1* | 1/2003 | Auclair | G02B 6/4471 385/136 |
| 2003/0068143 A1* | 4/2003 | Martinez | G02B 6/4463 385/100 |
| 2003/0128952 A1* | 7/2003 | Proscia | G02B 6/245 385/136 |
| 2003/0128960 A1* | 7/2003 | Sommer | G02B 6/3863 385/147 |
| 2003/0228807 A1* | 12/2003 | Mello | H01R 4/5083 439/796 |
| 2003/0231849 A1* | 12/2003 | Rodriguez | G02B 6/4445 385/135 |
| 2004/0150143 A1* | 8/2004 | Zimmer | E05F 5/10 267/64.11 |
| 2004/0203294 A1* | 10/2004 | Mello | H01R 4/5083 439/783 |
| 2004/0261264 A1* | 12/2004 | Swindell | G02B 6/483 29/868 |
| 2005/0066482 A1* | 3/2005 | De France | F16G 11/048 24/136 R |
| 2005/0226589 A1* | 10/2005 | Hafner | G02B 6/3857 385/139 |
| 2006/0009086 A1 | 1/2006 | Stanton | |
| 2007/0017689 A1* | 1/2007 | Polidori | H02G 7/053 174/84 C |
| 2008/0259631 A1* | 10/2008 | Holder | G02B 6/0008 362/554 |
| 2009/0136184 A1* | 5/2009 | Abernathy | G02B 6/4433 385/80 |
| 2009/0269012 A1* | 10/2009 | Marcouiller | G02B 6/4475 385/76 |
| 2009/0310928 A1* | 12/2009 | Kluwe | G02B 6/4477 385/135 |
| 2010/0054688 A1* | 3/2010 | Mullaney | G02B 6/4477 385/135 |
| 2010/0054689 A1* | 3/2010 | Mullaney | G02B 6/4477 385/135 |
| 2010/0059246 A1* | 3/2010 | Wakileh | G02B 6/4477 174/78 |
| 2010/0061685 A1* | 3/2010 | Kowalczyk | G02B 6/4471 385/100 |
| 2010/0092147 A1* | 4/2010 | Desard | G02B 6/4477 385/135 |
| 2010/0209062 A1* | 8/2010 | Sasada | G02B 6/4471 385/135 |
| 2010/0215331 A1* | 8/2010 | Gonzalez | G02B 6/4477 385/137 |
| 2010/0303433 A1* | 12/2010 | Gronvall | G02B 6/3897 385/135 |
| 2010/0310222 A1* | 12/2010 | Zhou | G02B 6/4466 385/135 |
| 2010/0329791 A1* | 12/2010 | Berg | H02G 1/10 405/158 |
| 2011/0211326 A1* | 9/2011 | Drouard | G02B 6/4444 361/814 |
| 2011/0283526 A1* | 11/2011 | Swindell | G02B 6/483 29/700 |
| 2011/0287662 A1* | 11/2011 | Crutcher | G01R 15/142 439/620.01 |
| 2012/0177334 A1* | 7/2012 | Holmberg | G02B 6/4471 385/135 |
| 2012/0180298 A1* | 7/2012 | Castonguay | G02B 6/3846 29/434 |
| 2012/0210544 A1* | 8/2012 | Shibilia | H02G 7/02 24/517 |
| 2012/0230646 A1* | 9/2012 | Thompson | G02B 6/3887 385/135 |
| 2012/0263540 A1* | 10/2012 | Berg | H02G 9/02 405/166 |
| 2014/0231598 A1* | 8/2014 | Miller | G02B 6/4471 248/63 |
| 2014/0338156 A1* | 11/2014 | Bayersdorfer | B60Q 3/78 24/304 |
| 2015/0086166 A1* | 3/2015 | Coate | G02B 6/25 385/95 |
| 2015/0200527 A1* | 7/2015 | Shibilia | H02G 7/056 29/446 |
| 2015/0212281 A1* | 7/2015 | McColloch | G02B 6/3853 385/59 |
| 2015/0316739 A1* | 11/2015 | Marmon | G02B 6/44 385/135 |
| 2015/0345668 A1* | 12/2015 | Blaser | F16L 5/02 277/606 |
| 2016/0003376 A1* | 1/2016 | Sakmar | F16L 3/11 248/63 |
| 2016/0010765 A1* | 1/2016 | Sakmar | G02B 6/4471 248/74.4 |
| 2016/0097910 A1* | 4/2016 | Segsworth | G02B 6/4478 385/136 |
| 2016/0223762 A1* | 8/2016 | Wong | G02B 6/3887 |
| 2016/0306126 A1* | 10/2016 | Verheyden | G02B 6/3898 |
| 2016/0333646 A1* | 11/2016 | Olin | E21B 17/1035 |
| 2016/0334579 A1* | 11/2016 | Park | G02B 6/4446 |
| 2016/0341912 A1* | 11/2016 | Saito | G02B 6/3846 |
| 2016/0341924 A1* | 11/2016 | Park | G02B 6/504 |
| 2017/0235082 A1* | 8/2017 | Thigpen | G02B 6/4471 385/136 |
| 2017/0241570 A1* | 8/2017 | Sakmar | F16L 3/11 |
| 2018/0031794 A1* | 2/2018 | Sakmar | G02B 6/4463 |
| 2018/0031795 A1* | 2/2018 | Al Ghossein | G02B 6/4478 |
| 2018/0059337 A1* | 3/2018 | Saito | G02B 6/3846 |
| 2018/0080958 A1* | 3/2018 | Marchese | G01R 15/242 |
| 2018/0136428 A1* | 5/2018 | Miller | G02B 6/483 |
| 2018/0136429 A1* | 5/2018 | Alston | G02B 6/4486 |
| 2018/0180753 A1* | 6/2018 | Rajeev | G02B 6/504 |
| 2018/0275351 A1* | 9/2018 | Parikh | G02B 6/3809 |
| 2018/0292569 A1* | 10/2018 | LeBlanc | G01D 5/353 |
| 2019/0056561 A1* | 2/2019 | Al Ghossein | F16L 3/1033 |
| 2019/0086003 A1* | 3/2019 | Jones | H02G 7/05 |
| 2019/0121035 A1* | 4/2019 | Al Ghossein | G02B 6/483 |
| 2019/0250359 A1* | 8/2019 | Yogeeswaran | G02B 6/486 |
| 2019/0278041 A1* | 9/2019 | Miller | G02B 6/4478 |
| 2020/0073071 A1* | 3/2020 | Allen | G02B 6/443 |
| 2020/0158978 A1* | 5/2020 | Alston | G02B 6/4497 |
| 2020/0174214 A1* | 6/2020 | Alves | G02B 6/4471 |
| 2020/0183117 A1* | 6/2020 | Coate | G02B 6/25 |
| 2020/0271861 A1* | 8/2020 | Blackwell, Jr | G02B 6/245 |

OTHER PUBLICATIONS

AFL Brochure, Fiber Optic Cable Hardware, 2002, 3 pgs.
PLP Brochure, Fiberlign Lite Tension Dead-end, Jun. 2011, 4 pgs.
International Preliminary Report on Patentability mailed in corresponding International Application PCT/US2019/63937 dated Jun. 17, 2021.

* cited by examiner

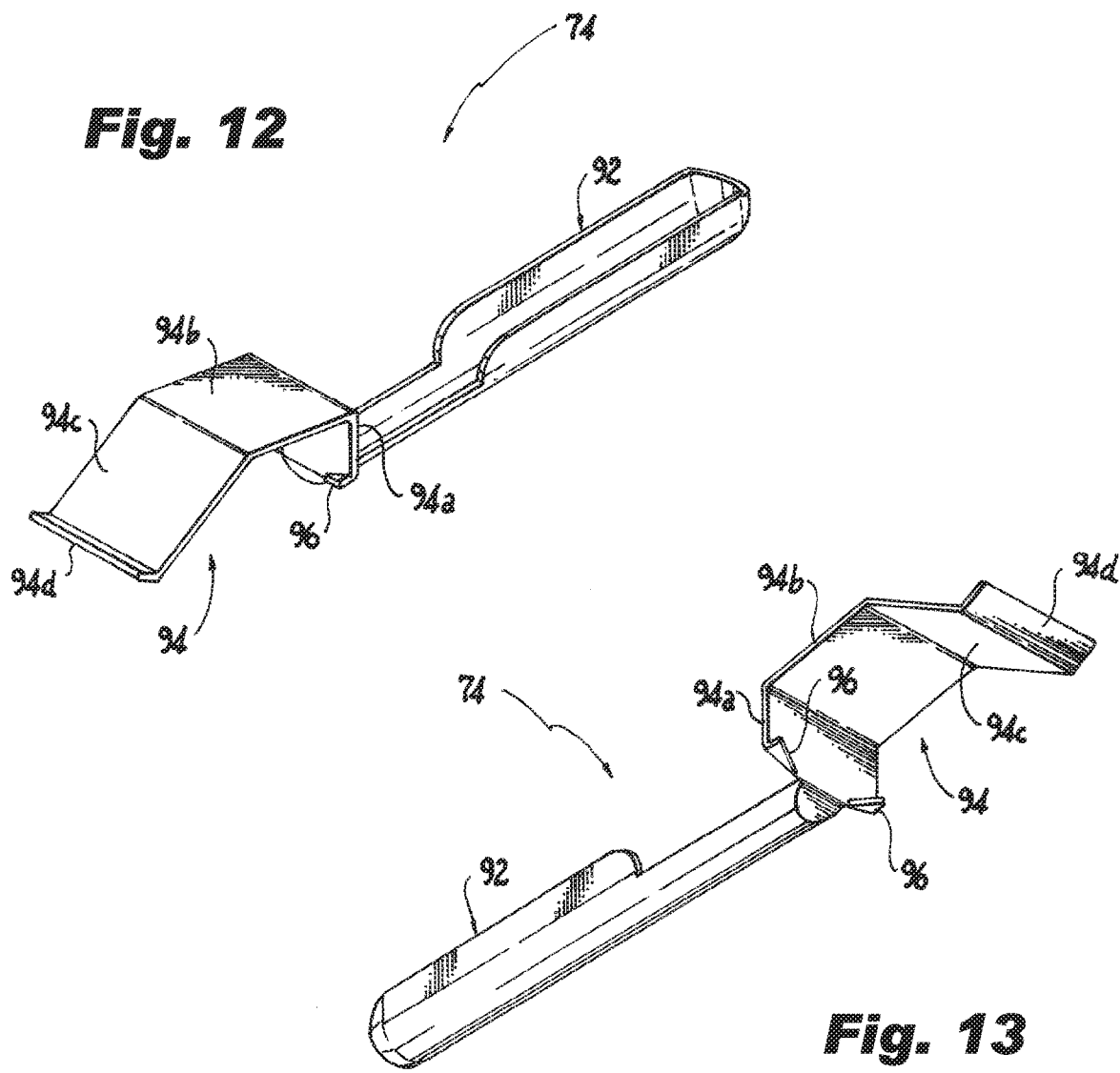
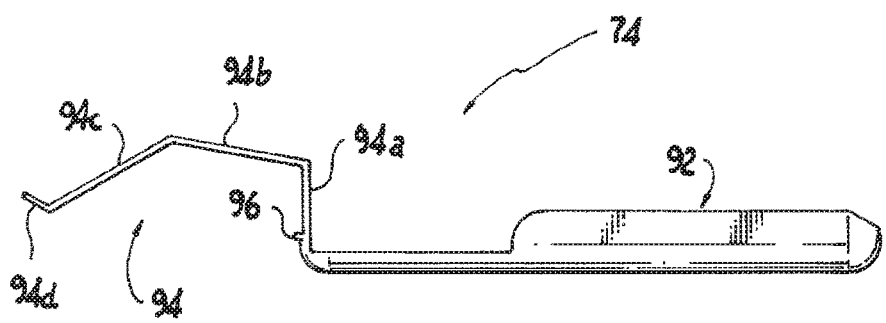

FIBER OPTIC DEAD-END CABLE CLAMP WITH CENTRAL ACTUATOR

CROSS-REFERENCE TO RELATED APPLICATIONS

The present disclosure is based on and claims benefit from U.S. Provisional Patent Application Ser. No. 62/775,193 filed on Dec. 4, 2018 entitled "Fiber Optic Dead-End Cable Clamp" the contents of which are incorporated herein in their entirety by reference.

BACKGROUND

Field

The present disclosure relates to dead-end clamp assemblies for attaching fiber optic cables of different sizes to a support. More particularly, the present disclosure relates to a wedge type dead-end clamp assembly in which jaws are used to grip fiber optic cables without damaging the individual glass fibers within the cable to transfer light.

Description of the Related Art

Aerial fiber optic cabling is typically strung from utility pole to utility pole, or from a utility pole to a building. The cabling between utility poles is often referred to as a main span. To withstand cable sag and environmental conditions, two types of fiber optic cables are available to string from pole-to-pole or from pole-to-building: lashed fiber optic cables or self-supporting fiber optic cables. Lashed fiber optic cable uses a galvanized steel support wire to which the fiber optic cable is affixed or lashed. Self-supporting fiber optic cable typically includes a strength member in the form of a messenger section supporting the fiber optic cable and a carrier section that includes optical glass fibers, or optical glass fibers and electrical conductors. An example of self-supporting fiber optic cable is All-Dielectric-Self Supporting (ADSS) cable.

Dead-end cable clamps anchor lashed fiber optic cables to utility poles or other support structures typically by attaching the galvanized steel support wire lash to a clamp that grips the lash so that tension on the lashed fiber optic cable is transferred through the dead-end cable clamp to the utility pole or other support structure. Since such clamps are designed to grip the wire lash there is little concern about the structural integrity of the wire lash as it is being clamped by the dead-end cable clamp. However, using conventional dead-end clamps for self-supporting fiber optic cables that do not have a wire lash increases the risk of damaging the individual glass fibers within the cable. In other words, using conventional dead-end cable clamps risks compressing or breaking one or more glass fibers within the self-supporting fiber optic cable possibly resulting in signal loss or failure.

Therefore, a need exists for a dead-end clamp configured to attach self-supporting fiber optic cable to a utility pole or other structure without damaging the individual glass fibers within the cable so that there is minimal risk of signal loss or failure.

SUMMARY

The present disclosure provides embodiments of dead-end cable clamp assemblies for clamping self-supporting fiber optic cables to utility poles or other structures. The clamp assemblies include a wedged-shaped body having a jaw receiving cavity. A portion of the body and jaw receiving cavity form a first jaw guide, and another portion of the body and jaw receiving cavity form a second jaw guide. A jaw actuator assembly is positioned within the jaw receiving cavity. A first jaw member is positioned within the first jaw guide and is operatively coupled to the jaw actuator assembly. A second jaw member is positioned within the second jaw guide and is operatively coupled to the jaw actuator assembly. By operatively coupling the jaw members to the jaw actuator assembly the first and second jaw members move together or at the same time within the jaw receiving cavity of the body between a loading position and a clamping position. The first and second jaw members are manually moved to the loading position. The jaw actuator assembly automatically moves the first and second jaw members to the clamping position and applies sufficient clamping or gripping force on the fiber optic cable to hold the fiber optic cable without degrading or damaging the fiber optic cable so as to reduce events of signal loss.

In one exemplary embodiment, the dead-end cable clamp has a wedge-shaped body having a jaw receiving cavity, a wedge-shaped first jaw member slidably positioned within a first jaw guide formed by the body and the jaw receiving cavity, a wedge-shaped second jaw member slidably positioned within a second jaw guide formed by the body and the jaw receiving cavity, and a jaw actuator assembly positioned within the jaw receiving cavity between the body and the first and second jaw members. The jaw actuator assembly is operatively coupled to the first and second jaw members so that the first and second jaw members move at the same time between the loading position and the clamping position. The first jaw guide is provided to guide the movement of the first jaw member relative to the body and to help hold the first jaw member captive within the body when in use. Similarly, the second jaw guide is provided to guide the movement of the second jaw member relative to the body and to help hold the second jaw member captive within the body when in use.

In another exemplary embodiment, the dead-end cable clamp has a body, a first jaw member, a second jaw member, a jaw actuator assembly and a bail wire. The body has a jaw receiving cavity and is tapered so that the body has a first width at a first end of the body and a second width at a second end of the body where the second width is greater than the first width. The first and second jaw members are slidably positioned within the jaw receiving cavity and movable between a loading position and a clamping position. At least a portion of the body and the jaw receiving cavity may form a first jaw guide, and at least another portion of the body and the jaw receiving cavity form a second jaw guide. The first jaw guide is provided to guide movement of the first jaw member relative to the body and to hold the first jaw member captive within the body when the clamp is in use. The second jaw guide is provided to guide the movement of the second jaw member relative to the body and to hold the second jaw member captive within the body when the clamp is in use. The first jaw member may include a side wall having a first cable gripping surface, e.g., teeth, knurling and/or dimples, and the second jaw member may include a side wall having a second cable gripping surface, e.g., teeth, knurling and/or dimples. The jaw actuator assembly is positioned within the jaw receiving cavity between the body and the first and second jaw members. The jaw actuator assembly is operatively coupled to the first and second jaw members so that the first and second jaw members can automatically move at substantially the same time between the loading position and the clamping position. The bail wire has each end coupled to the second end of the body.

In another exemplary embodiment, the dead-end cable clamp has a body, e.g., a tapered body, a first jaw member, a second jaw member and a jaw actuator assembly. The body has a jaw receiving cavity, and the first and second jaw members are slidably positioned within the jaw receiving cavity. At least a portion of the body and the jaw receiving cavity form a first jaw guide, and at least another portion of the body and the jaw receiving cavity form a second jaw guide. The first jaw guide is provided to guide movement of the first jaw member relative to the body and to hold the first jaw member captive within the body when the clamp is in use. The second jaw guide is provided to guide the movement of the second jaw member relative to the body and to hold the second jaw member captive within the body when the clamp is in use. The first jaw member may include a side wall having a first cable gripping surface, e.g., teeth, knurling and/or dimples, and the second jaw member may include a side wall having a second cable gripping surface, e.g., teeth, knurling and/or dimples. The jaw actuator assembly is positioned within the jaw receiving cavity between the body and the first and second jaw members. The jaw actuator assembly is operatively coupled to the first and second jaw members so that the first and second jaw members can automatically move at substantially the same time between a loading position and a clamping position. The jaw actuator assembly also causes the first and second jaw members to apply a gripping force on the cable to hold the cable within the body. In this exemplary embodiment, the dead-end cable clamp may also include a bail wire having each end coupled to the body.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 12 is a top perspective view of an exemplary embodiment of a spring fixture of the jaw actuator assembly according to the present disclosure;

FIG. 13 is a bottom perspective view of the spring fixture of FIG. 12;

FIG. 14 is a side elevation view of the spring fixture of FIG. 12;

DETAILED DESCRIPTION

Figure 1:
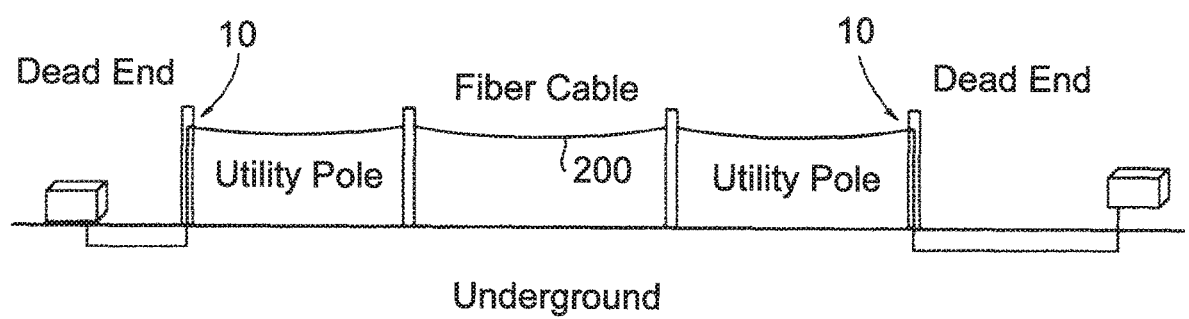
FIG. 1 is side elevation view of a fiber optic cable distribution system illustrating a self-supporting fiber optic cable spanning between dead-end cable clamp assemblies according to the present disclosure mounted to utility poles.

Exemplary embodiments of dead-end fiber optic cable clamp assemblies according to the present disclosure are shown. For ease of description, the dead-end fiber optic cable clamp assemblies described herein may also be referenced as the "clamp assembly" in the singular and the "clamp assemblies" in the plural. The clamp assemblies shown herein are dead-end cable clamps that are clamped directly to a fiber optic cable, such as a self-supporting fiber optic cable. As shown in FIG. 1, the clamp assemblies 10 are used to attach an end of a fiber optic cable 200 to a utility pole, a building or other structure. In addition, the clamp assemblies 10 according to the present disclosure are able to maintain tension on the self-supporting fiber optic cable 200 at maximum installation tension, at maximum elevated temperatures and at maximum loaded tension of the particular self-supporting fiber optic cable distribution system. The clamp assemblies 10 according to the present disclosure are capable of transferring the self-supporting fiber optic cable 200 load to a body of the cable clamp assembly 10. The clamp assemblies 10 according to the present disclosure also permit the self-supporting fiber optic cable 200 to maintain a minimum bending radius to prevent or limit signal degradation.

Figure 2:
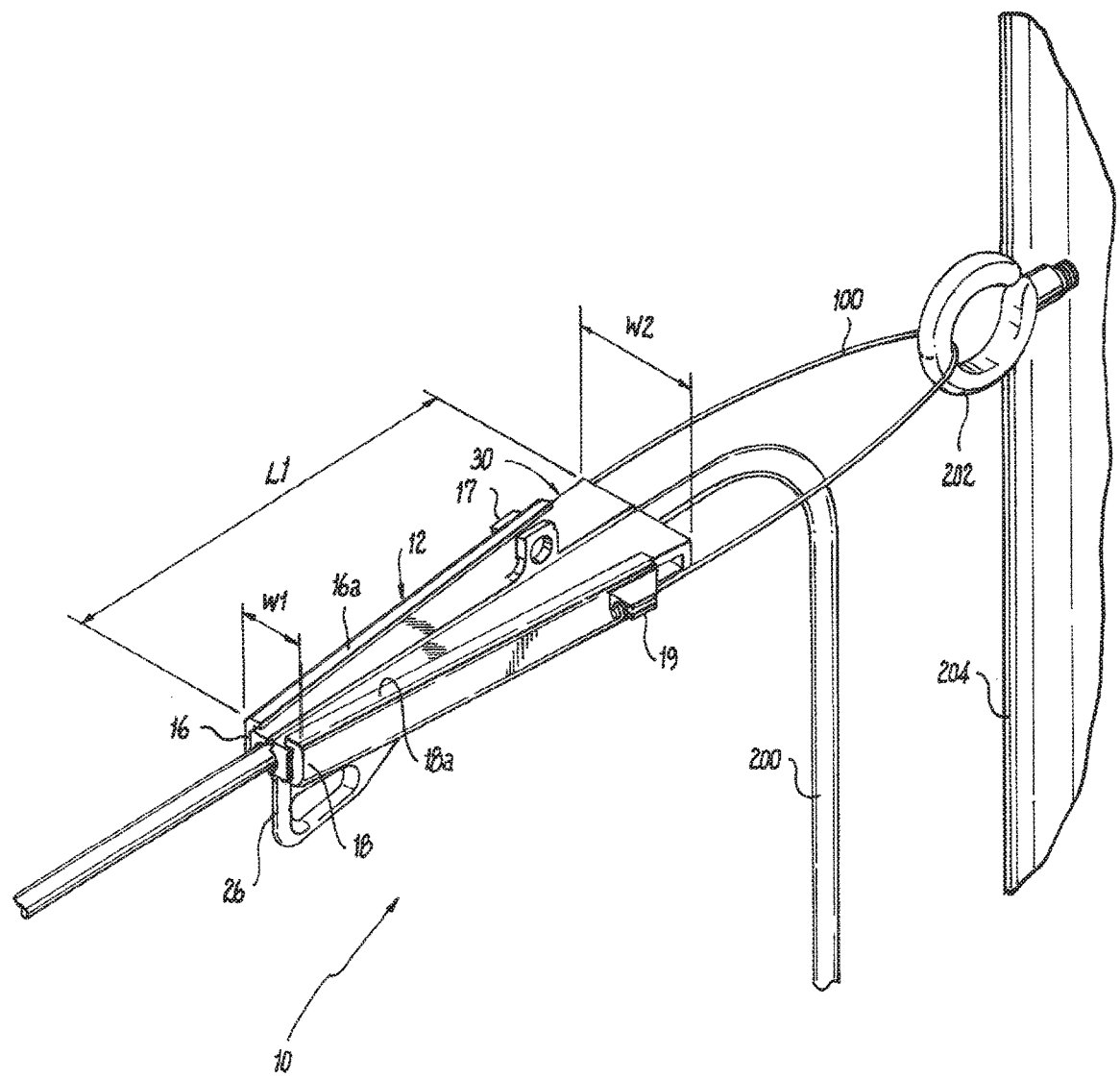
FIG. 2 is a top perspective view of an exemplary embodiment of a dead-end cable clamp assembly according to the present disclosure in a clamping position with a fiber optic cable clamped by the dead-end clamp assembly and attached to a utility pole.
Figure 3:
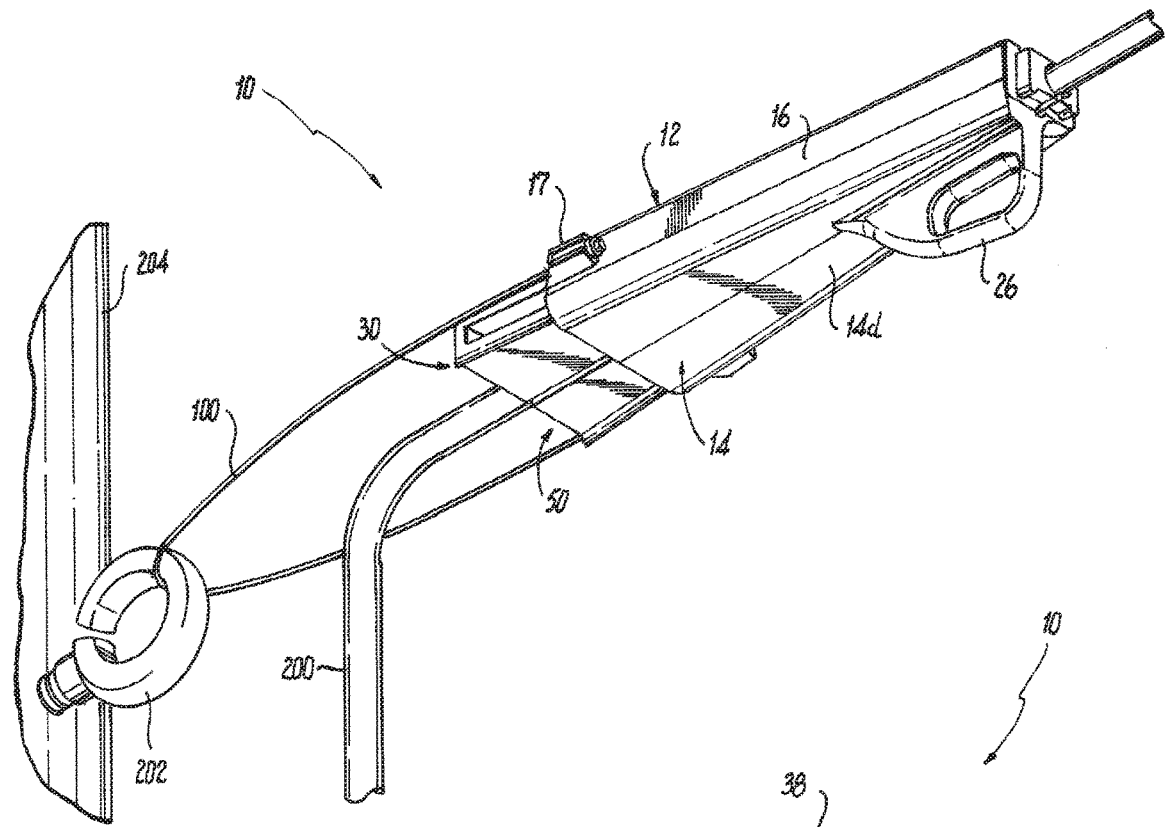
FIG. 3 is a bottom perspective view of the dead-end cable clamp assembly of FIG. 2.
Figure 4:
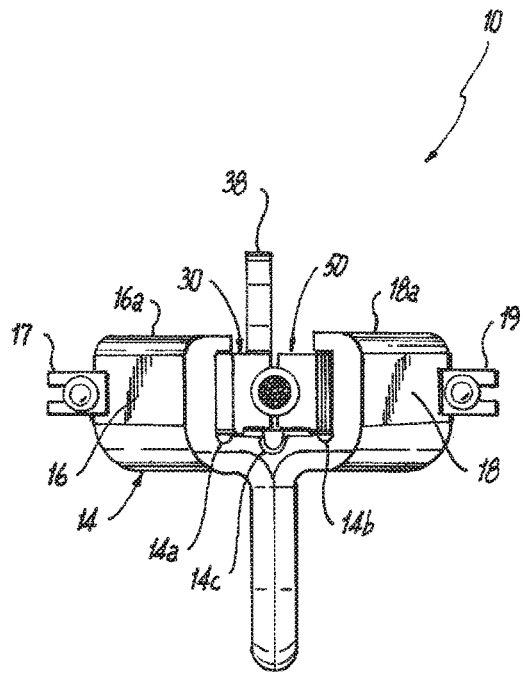
FIG. 4 is a front elevation view of the dead-end cable clamp assembly of FIG. 2.
Figure 5:
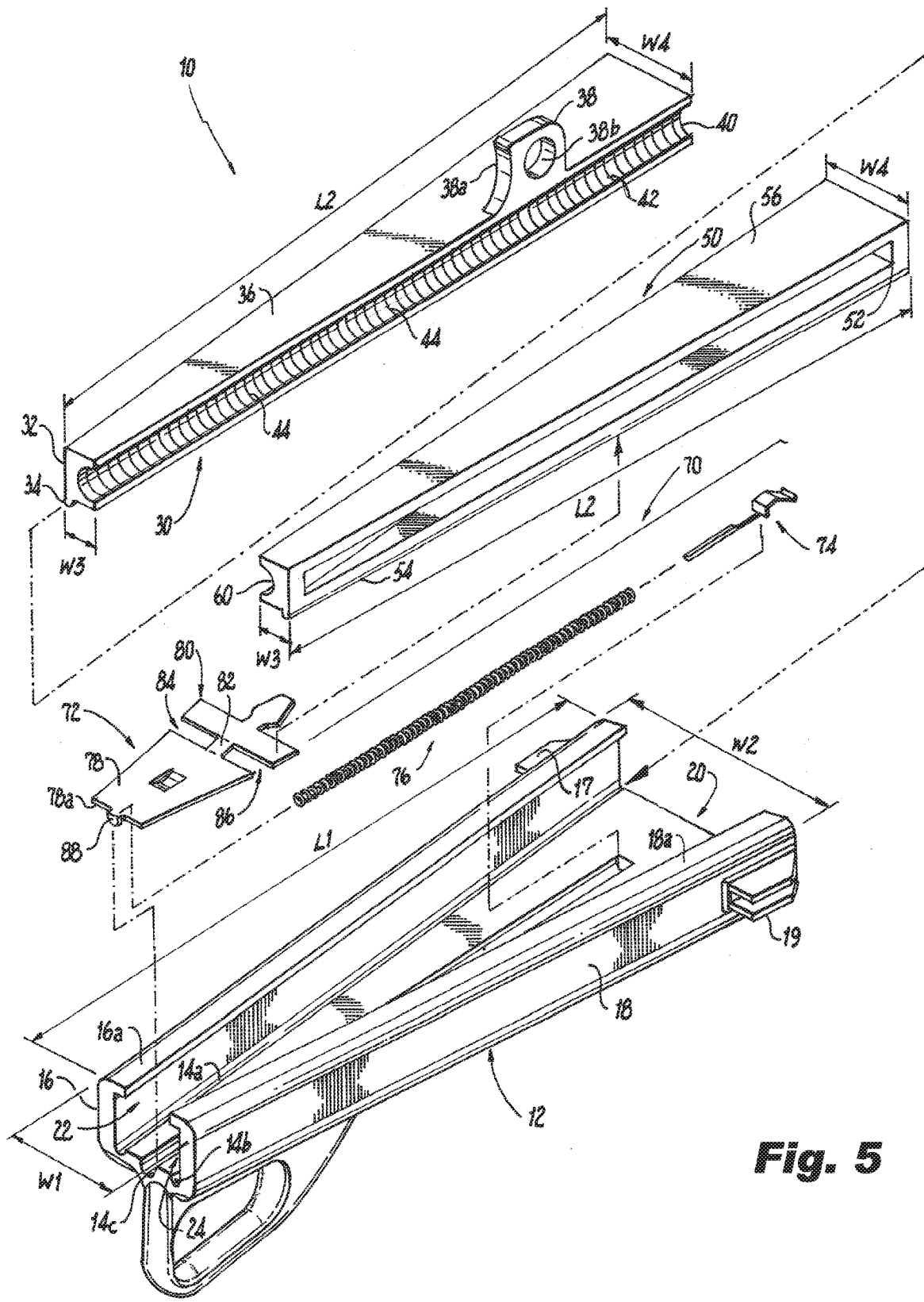
FIG. 5 is an exploded top perspective view of the dead-end cable clamp assembly of FIG. 2, illustrating a clamp body, a pair of jaw members and a jaw actuator assembly according to the present disclosure.

Referring to FIGS. 2-5, an exemplary embodiment of a clamp assembly according to the present disclosure is shown. The clamp assembly 10 includes a body 12, a first jaw member 30, a second jaw member 50, a jaw actuator assembly 70 and a bail wire 100. The body 12 is an elongated body having a length "L1" that is sufficient to grip or clamp a self-supporting fiber optic cable 200 and to support tension on the fiber optic cable without degrading or damaging individual glass fibers within the fiber optic cable 200. As a non-limiting example, the length of the body 12 may be about 5 inches or greater. The body 12 has a tapered width with width "W1" being the narrow portion of the taper and width "W2" being the wide portion of the taper, as shown in FIGS. 2 and 5. Generally, the angle of the taper between width W1 and width W2 is in a range of, for example, about 1 degree and about 8 degrees. The tapered width of the body 12 is sufficient to permit the clamp assembly 10 to grip or clamp fiber optic cables 200 having different widths. For example, if the clamp assembly is intended to clamp fiber optic cables 200 ranging from about 0.71 inches to about 1.1 inches, the narrow portion of the taper "W1" may be about 2 inches, and the wide portion of the taper "W2" may be about 5 inches. However, it is noted that the shape of the body 12 may vary from a wedge shape to other shapes sufficient to support a fiber optic cable. Further, the width of the body 12 may vary depending upon the materials used to fabricate the body 12.

Figure 6:
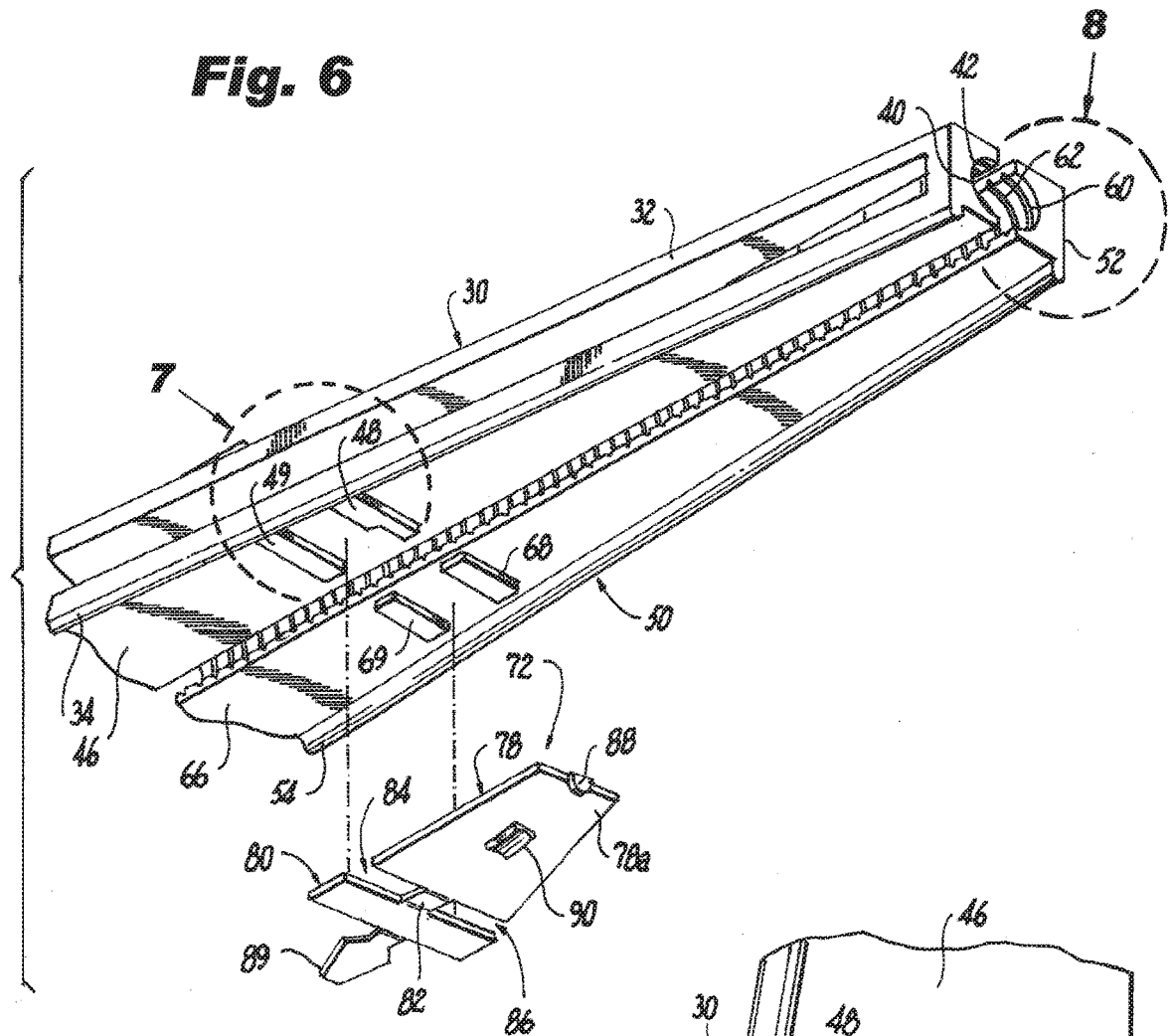
FIG. 6 is an exploded bottom perspective view of a portion of the dead-end cable clamp assembly of FIG. 5 taken from detail 6, illustrating a floater of the jaw actuator assembly operatively interacting with the jaw members.

Referring to FIGS. 3, 5 and 6, the body 12 has a base 14, a first side wall 16, a second side wall 18 and a jaw receiving cavity 20. The base 14 includes a first jaw track or groove 14a, a second jaw track or groove 14b and a floater track 14c. The first jaw track 14a is used to guide movement of the jaw member 30 within body 12, as described below. The second jaw track 146 is used to guide movement of the jaw member 50 within body 12, as described below. The floater track 14c is used to guide movement of a floater 72 of the jaw actuator assembly 70, seen in FIG. 5, and to receive a spring 76 of the jaw actuator assembly 70, as described below. A bottom surface 14d of the base 14 has an eye 26 extending substantially perpendicular to from the base 14. The eye 26 may be, for example, a sag eye. The eye 26 is used to connect the clamp assembly 10 to, for example, a hoist (not shown) that maintains tension on the self-supporting fiber optic cable 200 during installation of the clamp assembly 10. Once the bail wire 100 of the clamp assembly 10 is attached to the structure, e.g., a utility pole, the hoist is removed such that the load is transferred from the hoist to the clamp assembly 10 and from the clamp assembly 10 to the structure 204. The eye 26 is preferably positioned at or near the narrow portion of the taper of the body 12, as shown in FIGS. 3 and 5. Preferably, the body 12 is a unitary or monolithic structure made of a rigid metallic or non-metallic material that can withstand external environmental conditions and that can support the fiber optic cable 200. However, the body 12 may be made of individual components joined together by, for example, welds. Non-limiting examples of metallic materials include aluminum, cast aluminum, galvanized steel, stainless steel, or alloys such as aluminum alloy. Non-limiting examples of non-metallic materials include rigid plastics, e.g., thermoset or thermosetting plastics, or composite materials e.g., carbon fiber.

Continuing to refer to FIGS. 3, 5 and 6, the first side wall 16 extends from the base 14 and has a lip 16a and a bail wire connector 17 used to attach one end of the bail wire 100 to the body 12. The second side wall 18 extends from the base 14 and has a lip 18a and a bail wire connector 19 used to attach the other end of the bail wire 100 to the body 12. A portion of the jaw receiving cavity 20 associated with the base 14, the first jaw track 14a, the first side wall 16 and the lip 16a forms a first jaw guide 22 that faces toward the center of the body 12. A portion of the jaw receiving cavity 20 associated with the base 14, the second jaw track 14b, the second side wall 18 and the lip 18a forms a second jaw guide 24 that faces toward the center of the body 12. In this configuration, the first jaw guide 22 faces the second jaw guide 24. The body 12 and side walls 16 and 18 may be fabricated as a unitary or monolithic structure, or the body 12 and side walls 16 and 18 may be fabricated by securing the side walls 16 and 18 to the base 14 using welds, e.g., metallic or sonic welds, or mechanical fasteners. In the exemplary embodiment shown, the body 12 and side walls 16 and 18 may be fabricated as a unitary or monolithic structure.

Referring to FIGS. 5 and 6, in the exemplary embodiment shown, the first jaw member 30 is an elongated wedge-shaped member having a length "L2" that is preferably greater than or equal to the length "L1" of the body 12. The first jaw member 30 has a tapered width with width "W3" being the narrow portion of the taper and width "W4" being the wide portion of the taper, as shown in FIG. 5. The tapered width of the first jaw member 30 may vary depending on for example the size of the fiber optic cable 200 intended to be clamped by the clamp assembly 10. As such, the tapered width of the first jaw member 30 should be sufficient to fit within the jaw receiving cavity 20 of the body 12 to permit the first jaw member 30 together with the second jaw member 50 to move between a loading position and a clamping position described below. For example, if the clamp assembly 10 is intended to clamp fiber optic cables 200 having an outside diameter ranging from about 0.71 inches to about 1.1 inches, the narrow portion of the taper "W3" may be about 0.70 inches, and the wide portion of the taper "W4" may be about 2.10 inches. Generally, the angle between the width W3 and the width W4 is in a range of about 1 degree to about 8 degrees.

Figure 8:
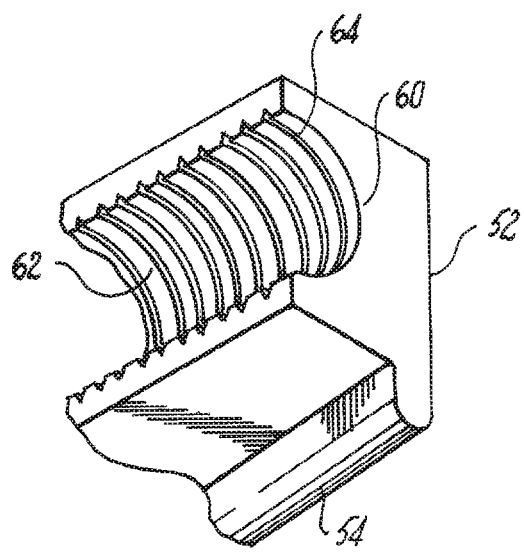
FIG. 8 is an enlarged bottom perspective view of a portion of a cable gripping surface of a jaw member of FIG. 6 taken from detail 8.
Figure 18:
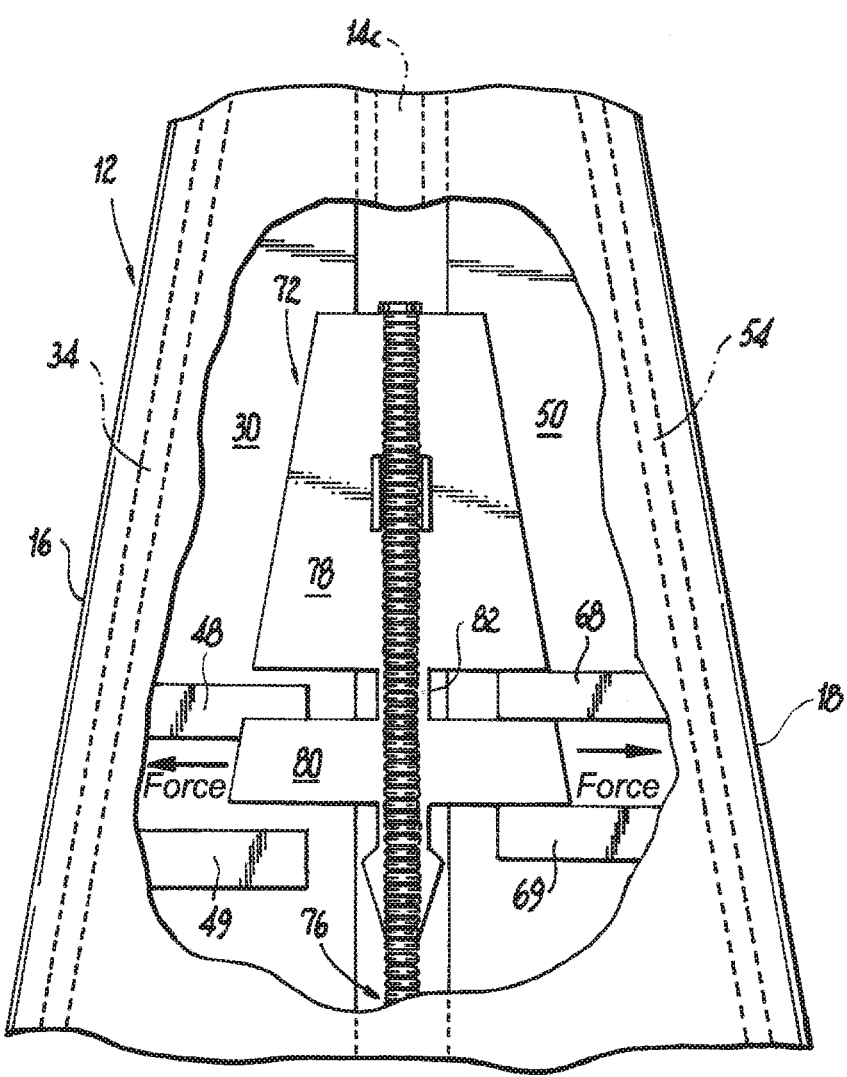
FIG. 18 is a bottom plan view of the dead-end cable clamp assembly of FIG. 17, illustrating the body of the dead-end cable clamp assembly partially cut away revealing the floater of the jaw actuator assembly positioned within a notch in the floater rail extending from a bottom surface of the jaw member holding the jaw members in the loading position.

The first jaw member 30 has a side wall 32 that is substantially flat so that the side wall 32 can be positioned adjacent the first side wall 16 of the body 12, as shown in FIGS. 2-4. The side wall 32 includes a guide rail 34 extending from a bottom portion of the side wall, as seen in FIG. 5. The guide rail 34 may extend along the entire length of the side wall 32 or the along a portion of the length of the side wall 32. In another exemplary embodiment, the guide rail 34 may be a series of segmented rails with spaces between each segment. In the embodiment shown, the guide rail 34 extends along the entire length of the side wall 32. The guide rail 34 is configured to fit within the first jaw track 14a of the base 14 to guide the first jaw member 30 as it moves between the loading position and the clamping position. A top surface 36 of the first jaw member 30 includes a pull arm 38 extending therefrom. The pull arm 38 may include an arcuate surface 38a and/or a bore 38b to better fit a finger of a technician when installing a fiber optic cable 200 into the clamp assembly 10. The first jaw member 30 has a side wall 40 that has a cable gripping surface 42, seen in FIG. 5, that may have various shapes depending upon, for example, the shape of the fiber optic cable 200 being clamped by the clamp assembly 10. In the exemplary embodiment shown, the cable gripping surface 42 is an arcuate surface. The cable gripping surface 42 may include one or more cable grippers 44, similar to the cable grippers 64 seen in FIG. 8. The one or more cable grippers 44 may be any structure sufficient to grip the outer sheathing of the fiber optic cable 200 without penetrating through the outer sheathing. As non-limiting examples, the cable grippers 44 may be teeth, knurling or dimples. In the exemplary embodiment shown, the cable grippers 44 are teeth. A bottom surface 46 of the first jaw member 30 includes one or more floater rails 48 and 49 that extend from the guide rail 34 toward the side wall 40. The one or more floater rails 48 and 49 interact with a floater 72 of the jaw actuator assembly 70 as described below and are used to move the jaw member 30 between the loading position and the clamping position. The floater rail 48 includes a notch 48a having a tapered (or beveled) side wall 48b and a stop wall 48c. The tapered side wall 48b has an angle "a" that may range from about 8 degrees and about 12 degrees. The notch 48a is used to lock the jaw members 30 and 50 in the loading position by causing the jaw members 30 and 50 to apply a constant force against the respective side walls 16 and 18 of the body 12, as seen in FIGS. 3, 5 and 18.

Continuing to refer to FIGS. 5 and 6, the shape of the second jaw member 50 may be symmetric or asymmetric with the first jaw member 30. In the exemplary embodiment shown, the shape of the second jaw member 50 is substantially symmetrical with the first jaw member 30. In this exemplary embodiment, the second jaw member 50 is an elongated wedge-shaped member having a length "L2" that is similar to the length of the first jaw member 30 and is preferably greater than or equal to the length "L1" of the body 12. The second jaw member 50 has a tapered width that is similar to the tapered width of the first jaw member 30, where the width "W3" is the narrow portion of the taper and the width "W4" is the wide portion of the taper, as shown. The tapered width of the second jaw member 50 may vary depending on for example the size of the fiber optic cable 200 intended to be clamped by the clamp assembly 10. As such, the tapered width of the second jaw member 50 should be sufficient to fit within the jaw receiving cavity 20 of the body 12 to permit the second jaw member 50 together with the first jaw member 30 to move between the loading position and the clamping position described below. For example, if the clamp assembly 10 is intended to clamp fiber optic cables 200 with an outside diameter ranging from about 0.71 inches to about 1.1 inches, the narrow portion of the taper "W3" may be about 0.70 inches, and the wide portion of the taper "W4" may be about 2.10 inches. Generally, the angle between the width W3 and the width W4 is in a range of about 1 degree to about 8 degrees.

The second jaw member 50 has a side wall 52 that is substantially flat so that the side wall 52 can be positioned adjacent the side wall 18 of the body 12, as shown in FIGS. 2-4. The side wall 52 includes a guide rail 54 extending from a bottom portion of the side wall, as seen in FIGS. 5 and 6. The guide rail 54 may extend along the entire length of the side wall 52 or the along a portion of the length of the side wall 52. In another exemplary embodiment, the guide rail 54 may be a series of segmented rails with spaces between each segment. In the embodiment shown, the guide rail 54 extends along the entire length of the side wall 52. The guide rail 54 is configured to fit within the second jaw track 14b of the base 14 to guide the second jaw member 50 as it moves between the loading position and the clamping position. A top surface 56 of the second jaw member 50 may include a pull arm (not shown) which is similar to pull arm 38 described above. The second jaw member 50 has a side wall 60 that has a cable gripping surface 62, seen in FIGS. 6, 7 and 8 that may have various shapes depending upon, for example, the shape of the fiber optic cable being clamped by the clamp assembly 10. In the exemplary embodiment shown, the cable gripping surface 62 is an arcuate surface that is substantially similar to the arcuate surface 42 of the first jaw member 30. The cable gripping surface 62 may include one or more cable grippers 64, seen in FIG. 8. The one or more cable grippers 64 may be any structure sufficient to grip the outer sheathing of the fiber optic cable 200 without penetrating through the outer sheathing. As non-limiting examples, the cable grippers 64 may be teeth, knurling or dimples. In the exemplary embodiment shown, the cable grippers 64 are teeth. A bottom surface 66, seen in FIG. 6, of the second jaw member 50 includes one or more floater rails 68 and 69 that extend from the guide rail 54 toward the side wall 60. The one or more floater rails 68 and 69 interact with the floater 72 of the jaw actuator assembly 70 as described below and are used to move the second jaw member 50 between the loading position and the clamping position.

Preferably, the first and second jaw members 30 and 50 are unitary or monolithic structures made of a rigid metallic or non-metallic material that can withstand external environmental conditions and clamp the fiber optic cable 200. However, the jaw members 30 and 50 made be made of individual components joined together by, for example, welds. Non-limiting examples of metallic materials include aluminum, cast aluminum, galvanized steel, stainless steel, or alloys such as aluminum alloy. Non-limiting examples of non-metallic materials include rigid plastics, e.g., thermoset or thermosetting plastics, or composite materials e.g., carbon fiber.

Overall, the body 12 and jaw members 30 and 50 are configured and dimensioned to maintain the self-supporting fiber optic cable 200 within the clamp assembly 10 with minimal slipping or preferably without slipping. To limit or prevent slipping of the self-supporting fiber optic cable 200 the length of the body 12 and jaw members 30 and 50 may be lengthened or shortened and/or the angle of the body 12 and jaw members 30 and 50 may be increased or decreased. Factors to consider when determining the length of the body 12 and jaw members 30 and 50 and/or the angle of the body 12 and jaw members 30 and 50 include the size and maximum load of the self-supporting fiber optic cable 200, the angle and cable gripping surfaces of the jaw members, including the radius of the cable gripping surfaces of the jaw members 30 and 50 and whether or not the cable gripping surfaces include one or more cable grippers 44 and 46 and the type of cable grippers, e.g., teeth, knurling or dimples.

Referring now to FIGS. 5, 6, 9-14, the clamp assembly 10 according to the present disclosure also includes a jaw actuator assembly 70 used to activate the jaw members 30 and 50 to move the jaw members 30 and 50 from the loading position to the clamping position described herein. The jaw actuator assembly 70 includes a floater 72, a spring fixture 74 and a spring 76. The floater 72 may have a number of different shapes, such as a square shape, a rectangular shape or a wedge shape. The shape of the floater 72 should be configured so that the floater 72 can fit within the jaw receiving cavity 20 and move with the jaw members 30 and 50 between the loading position and the clamping position. The floater 72 is a platform on which the jaw members 30 and 50 may at least partially rest and which operatively interconnects the floater 72 to the jaw members. More specifically, in the exemplary embodiment shown in FIGS. 9-11, the floater 72 includes one or more pockets 84 and 86 configured to receive one or more of the floater rails 48 and 68 extending from the bottom surfaces of the respective jaw members 30 and 50, as seen in FIG. 6. The one or more pockets 84 and 86 and the floater rails 48 and 68 operatively interconnect the floater 72 to the jaw members 30 and 50 so that the jaw members 30 and 50 move together or at the same time between the loading position and the clamping position. The one or more pockets 84 and 86 may be, for example, openings, channels or grooves in the floater 72.

Figure 9:
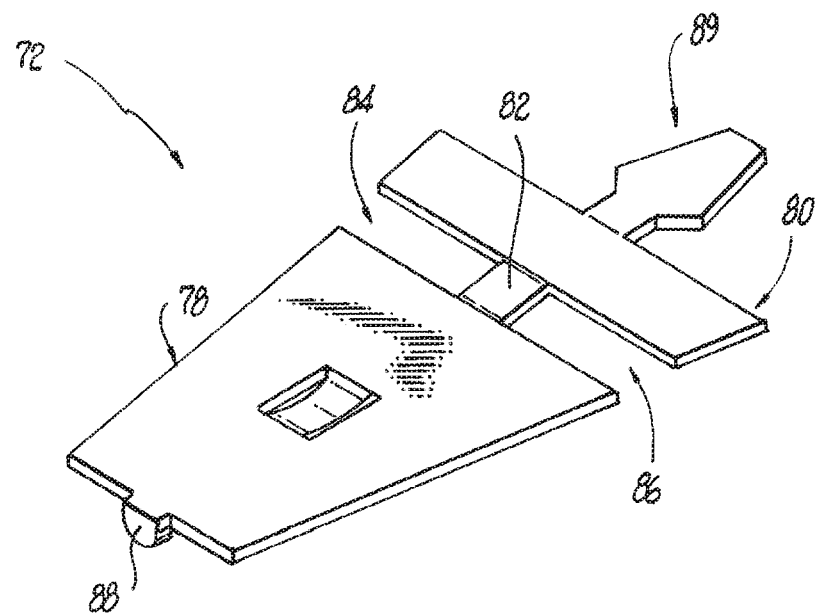
FIG. 9 is a top perspective view of an exemplary embodiment of the floater of the jaw actuator assembly according to the present disclosure.
Figure 10:
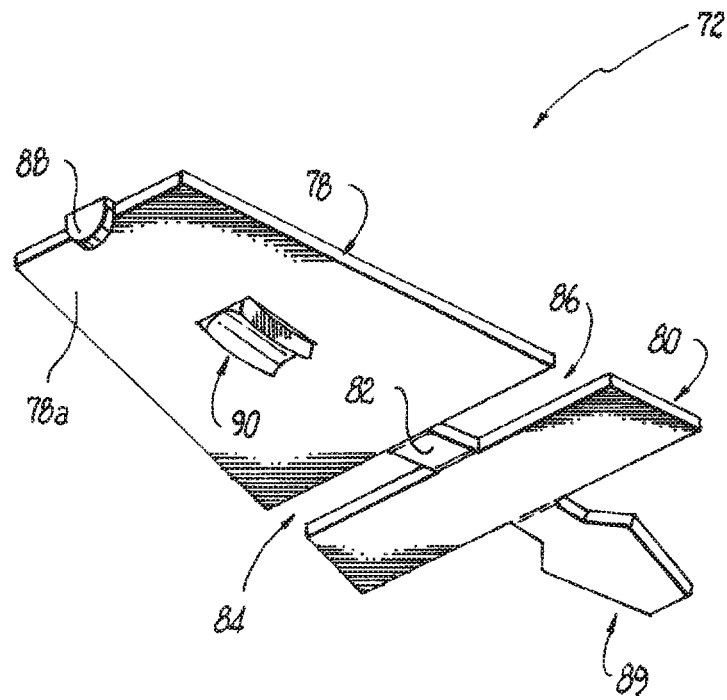
FIG. 10 is a bottom perspective view of the floater of FIG. 9.
Figure 11:
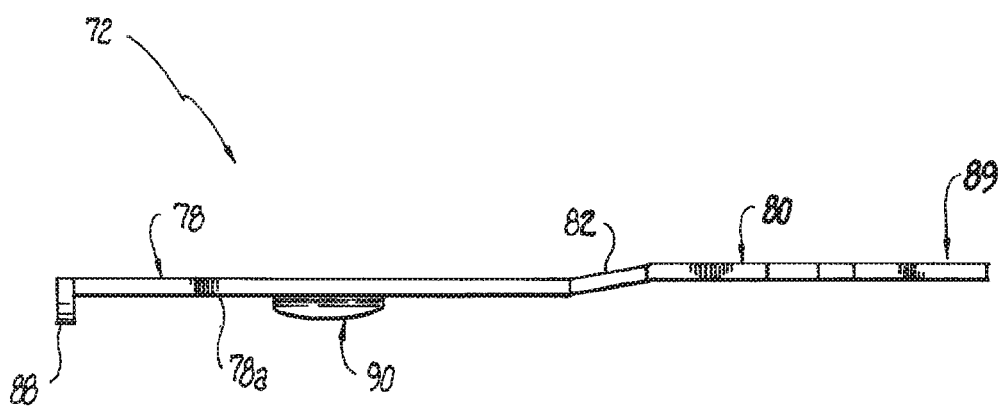
FIG. 11 is a side elevation view of the floater of FIG. 9.

In the exemplary embodiment shown in FIGS. 9-11, the floater 72 is a substantially wedge-shaped member having a first platform portion 78, a second platform portion 80, an offset bridge 82 and a lift plate 89 extending from the second platform portion 80. The offset bridge 82 connects the first platform portion 78 to the second platform portion 80 such that there are two pockets 84 and 86 between the first platform portion 78 and the second platform portion 80. The offset bridge 82 offsets the second platform portion 80 such that the second platform portion 80 is in a different plane than the first platform portion 78. The pocket 84 is configured to receive the floater rail 48 extending from the bottom surface 46 of the first jaw member 30, as seen in FIG. 6. The pocket 86 is configured to receive the floater rail 68 extending from the bottom surface 66 of the second jaw member 50, as seen in FIG. 6. The offset bridge 82 of the floater 72 ensures the floater rails 48 and 68 of the respective jaw members 30 and 50 are received in their respective pocket 84 or 86.

Extending from a bottom surface 78a of the first platform portion 78 is a floater rail 88 configured to slide within the floater track 14c in the base 14. The floater rail 88 is configured to engage one end of the spring 76 and is used to compress the spring 76 when the jaw members 30 and 50 are moved to the loading position. The floater rail 88 also helps maintain the positioning of the floater 72 relative to the body 12 and the jaw members 30 and 50 as the floater 72 moves within the jaw receiving cavity 20 in the body 12 as described below. Extending from a bottom surface 78a of the first platform portion 78 is a spring guide 90 configured to slide within the floater track 14c in the base 14 and to at least partially conform to the shape of the spring 76 so that the spring 76 can at least partially rest within the spring guide 90. The spring guide 90 is provided to help maintain the spring 76 within the floater track 14c along with the first platform portion 78, the second platform portion 80 and the bridge 82. The spring guide 90 may also help maintain the positioning of the floater 72 relative to the body 12 and the jaw members 30 and 50 as the floater 72 moves within the jaw receiving cavity 20 in the body 12 as described below.

Preferably, the floater 72 is a unitary or monolithic structure made of a rigid metallic or non-metallic material that can withstand external environmental conditions and that can support movement of the jaw members 30 and 50. However, the floater 72 may be made of individual components joined together by, for example, welds. Non-limiting examples of metallic materials include aluminum, cast aluminum, galvanized steel, stainless steel, or alloys such as aluminum alloy. Non-limiting examples of non-metallic materials include rigid plastics, e.g., thermoset or thermosetting plastics, or composite materials e.g., carbon fiber.

Figure 16:
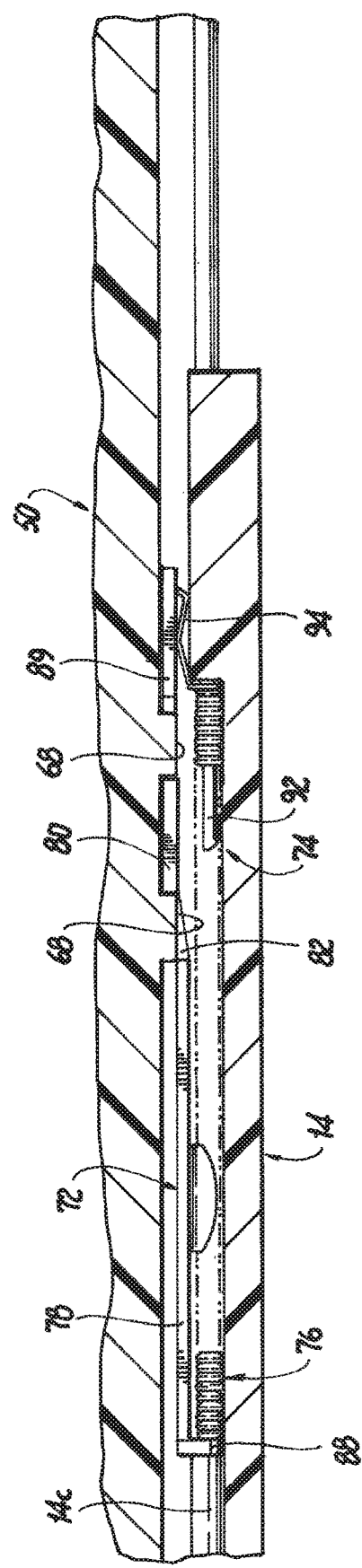
FIG. 16 is a side elevation view in partial cross-sectional of the dead-end cable clamp assembly of FIG. 15 taken from detail 16, illustrating the dead-end cable clamp assembly in the loading position and the jaw actuator assembly positioned within a body of the dead-end cable clamp assembly and operatively connected to the jaw members.

Referring now to FIGS. 12-14, an exemplary embodiment of the spring fixture 74 according to the present disclosure is shown. The spring fixture 74 is configured and dimensioned to fit partially within the floater track 14c in the base 14, seen in FIGS. 5 and 16, and is coupled to the spring 76 sitting within the floater track 14c. The spring fixture 74 includes a spring holder 92 configured to fit within the spring 76, as seen in FIGS. 5 and 16, and a tension plate 94 attached to or integrally or monolithically formed into the spring holder 92. The tension plate 94 is provided to engage the floater 72 when the jaw members 30 and 50 are in the loading position. The tension plate 94 contacts the lift plate 89 of the floater 72 and exerts an upward force on the lift plate 89 to help maintain the spring 76 within the floater track 14c. In the embodiment shown, the tension plate 94 is a U-shaped like plate having a vertical wall 94a, a flat wall 94b, and angled wall 94c and a lip 94d extending from the angled wall 94c. The vertical wall 94a includes one or more teeth 96 that engage a wall of the floater track 14c to hold the spring holder 92 in position within the floater track 14c. When the jaw members 30 and 50 are in the loading position, seen in FIG. 17, the floater 72 rests on the flat wall 94b, and the angled wall 94c and the lip 94d contact the base 14 of the body 12 to create the upward force on the jaw members 30 and 50 resting on the flat wall 94b of the tension plate 94.

Referring to FIGS. 5 and 16, the spring 76 is preferably a compression spring configured and dimensions to store sufficient force to move the jaw members 30 and 50 from the loading position to the clamping position to grip the fiber optic cable 200 without degrading or damaging individual optical glass fiber within the fiber optic cable 200. Preferably, the spring 76 is made of a metallic or non-metallic material that can withstand external environments and generate the desired force to move the clamp assembly 10 and wedge a fiber optic cable 200 between the jaw members 30 and 50. Non-limiting examples of metallic materials include aluminum, cast aluminum, galvanized steel, stainless steel, or alloys such as aluminum alloy. Non-limiting examples of non-metallic materials include rigid plastics, e.g., thermoset or thermosetting plastics, or composite materials e.g., carbon fiber.

To assemble the clamp assembly 10 of the present disclosure, the jaw actuator assembly 70 is positioned within the body 12 by inserting spring holder 92 of the spring fixture 74 into one end of the spring 76. The spring fixture 74 and spring 76 are then inserted into the floater track 14c in the base 14 such that the spring fixture 74 is at a closed end of the floater track 14c and the tension plate 94 at least partially rests on the base 14. The floater 72 is then positioned over the spring 76 such that the floater rail 88 is adjacent the end of the spring 76 opposite the spring fixture 74 and the spring guide 90 is positioned to rest on the spring 76 as seen in FIG. 16. The first jaw member 30 is positioned within the jaw receiving cavity 20 such that at least a portion of the first jaw member 30 fits within the first jaw guide 22, the guide rail 34 is positioned within the first jaw track 14a of the base 14, as shown in FIGS. 2 and 5, and the floater rail 48 extending from the first jaw member 30 is positioned within the pocket 84 of the floater 72, seen in FIG. 6. Similarly, the second jaw member 50 is positioned within the jaw receiving cavity 20 such that at least a portion of the second jaw member 50 fits within the second jaw guide 24, the guide rail 54 is positioned within the second jaw track 14b of the base 14, as shown in FIGS. 2 and 5, and the floater rail 68 extending from the second jaw member 50 is positioned within the pocket 86 of the floater 72, seen in FIG. 6. The first jaw member 30 and the second jaw member 50 are configured to slide within the jaw receiving cavity 20 between the loading position where the jaw members 30 and 50 are separated sufficient to permit a fiber optic cable 200 to be inserted between cable gripping surfaces 42 and 62 of the respective jaw members 30 and 50, and a clamping position where the jaw members 30 and 50 grip the fiber optic cable 200 sufficient to hold the fiber optic cable within the clamp assembly 10 without degrading or damaging the glass fiber within the fiber optic cable 200. In this configuration, the jaw members 30 and 50 can grip or clamp fiber optic cables 200 with different diameters such that the clamping position may differ for difference size fiber optic cables 200. As a non-limiting example, the jaw members 30 and 50 can grip or clamp fiber optic cables having an outside diameter ranging from about 0.71 inches to about 1.1 inches. It is noted that the body 12 and jaw members 30 and 50 may include corresponding projections that act as a stop to set a fixed clamping position for the jaw members 30 and 50.

Figure 7:
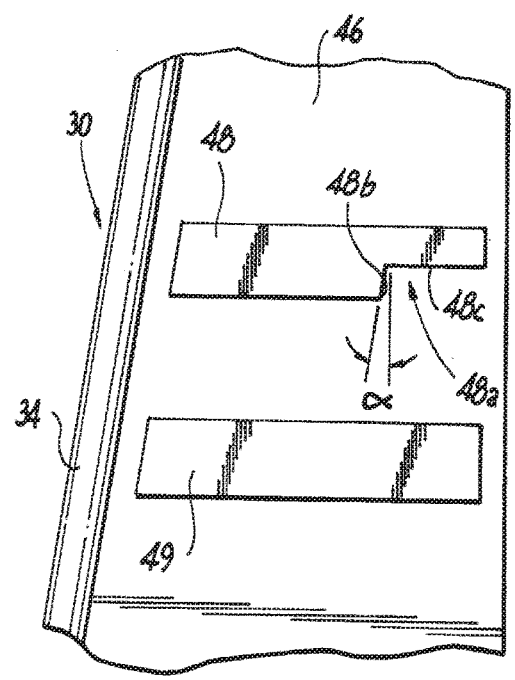
FIG. 7 is a bottom plan view of a portion of a jaw member of FIG. 6 taken from detail 7 and illustrating floater rails extending from a bottom surface of the jaw member.
Figure 15:
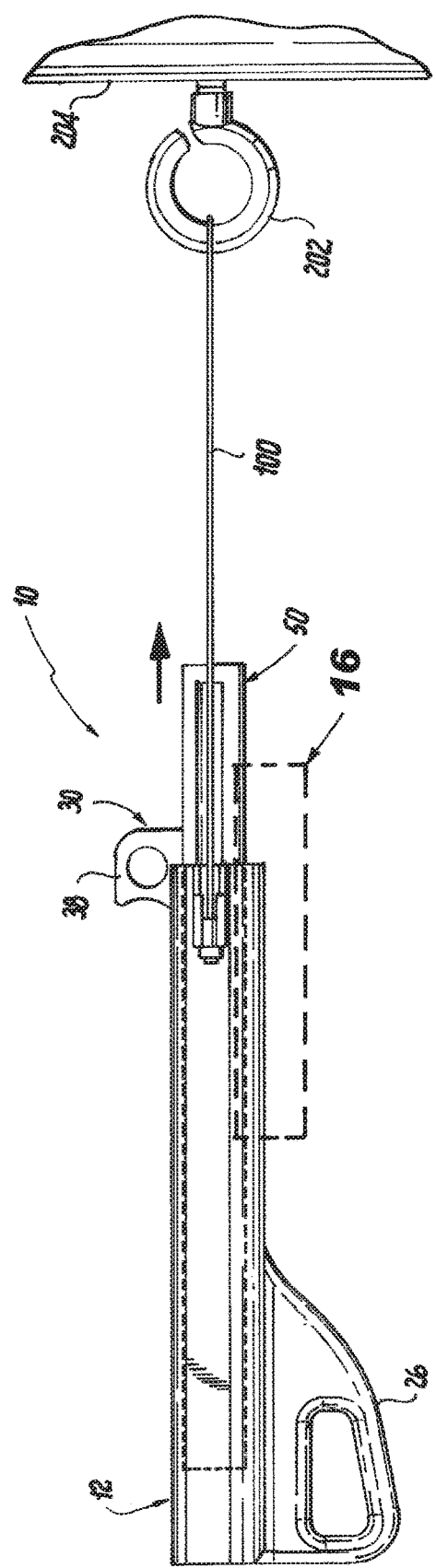
FIG. 15 is a side elevation view of the dead-end cable clamp assembly according to the present disclosure attached to a utility pole, and illustrating the dead-end cable clamp assembly in a loading position.
Figure 17:
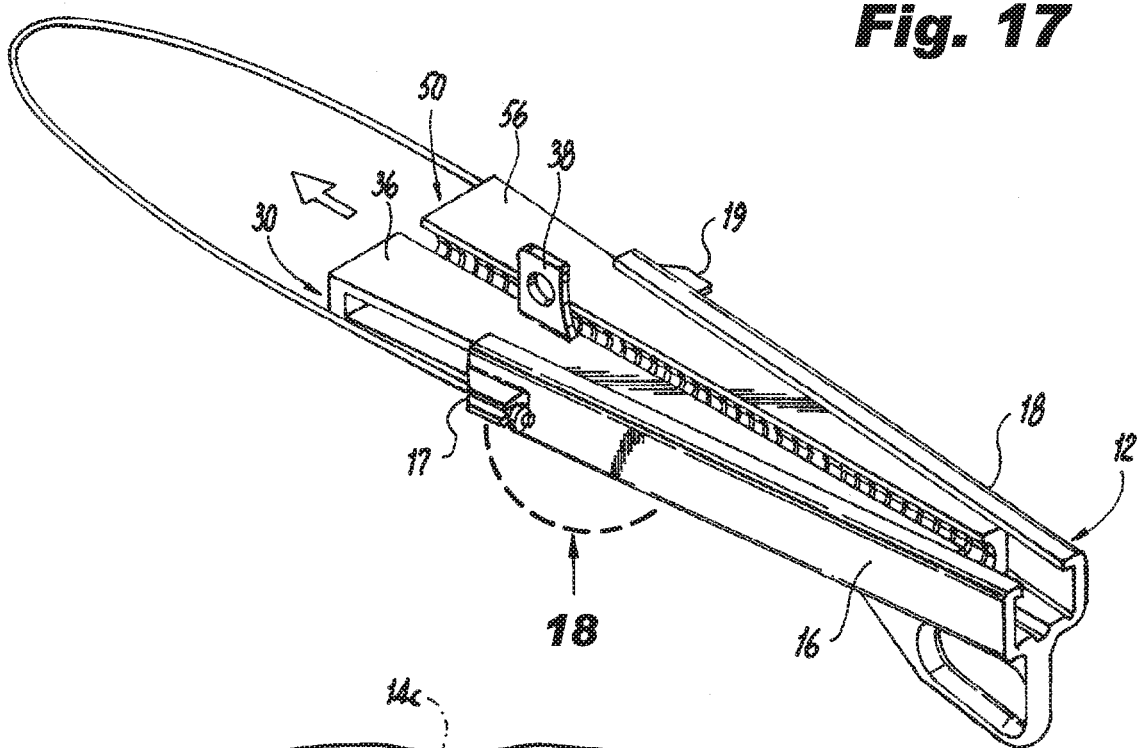
FIG. 17 is a top perspective view of the dead-end cable clamp assembly of FIG. 15.
Figure 19:
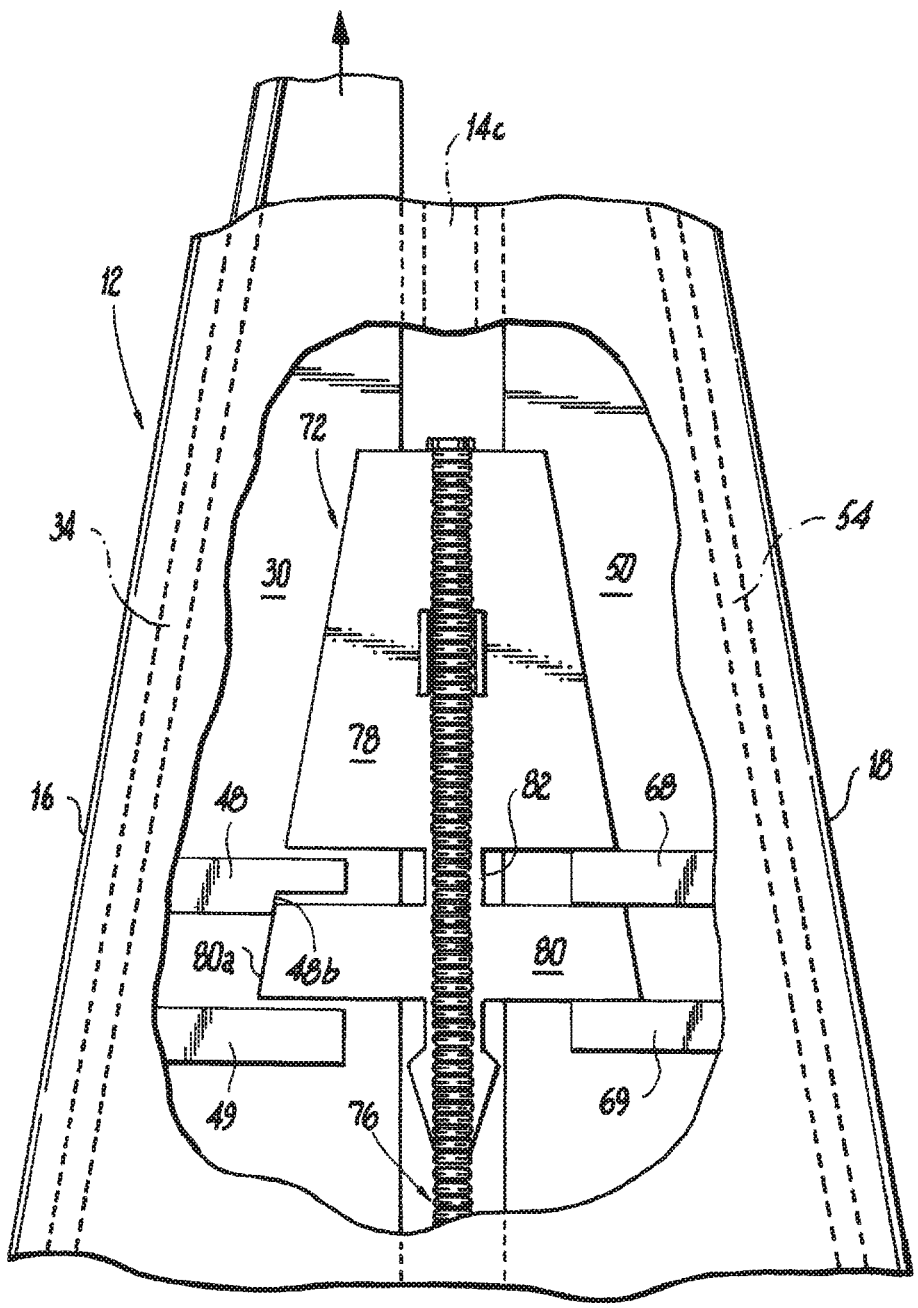
FIG. 19 is a bottom plan view of the dead-end cable clamp assembly similar to FIG. 18, illustrating the floater of the jaw actuator assembly sliding along an edge of the notch in the floater rail as the jaw members are manually urged forward to release the jaw members from the loading position.
Figure 20:
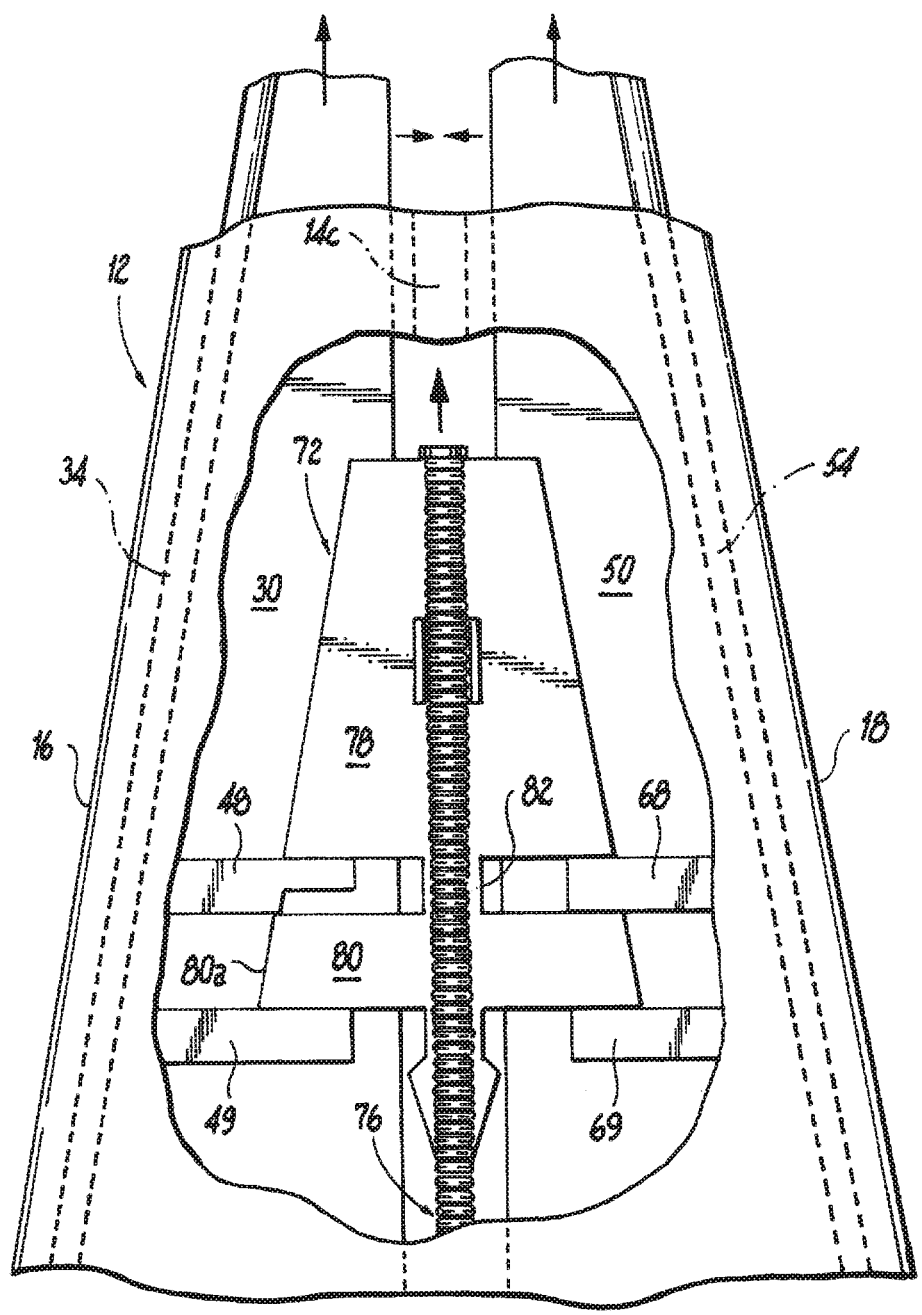
FIG. 20 is a bottom plan view of the dead-end cable clamp assembly similar to FIG. 19, illustrating the floater of the jaw actuator assembly disengaged from the notch in the floater rail such that the jaw members are released from the loading position.

To install the clamp assembly 10 according to the present disclosure, a technician ensures that the jaw members 30 and 50 of the clamp assembly 10 are in the loading position by pulling on the pull arm 38 extending from the first jaw member 30 until the second platform portion 80 of the floater 72 is positioned within the notch 48*a* in the floater rail 48, as seen in FIGS. 7 and 18. As noted above, when in the loading position, having the second platform portion 80 of the floater 72 positioned within the notch 48*a* in the floater rail 48 causes the jaw members 30 and 50 to apply a force in the direction shown in FIG. 18 such that the side walls 32 and 52 of the respective jaw members 30 and 50 contact the respective side walls 16 and 18 of the body 12 holding the jaw members 30 and 50 in the loading position. Further, when in the loading position the spring 76 is compressed storing energy and the jaw members 30 and 50 may extend outside the body 12, as seen in FIGS. 15 and 17. With the jaw members 30 and 50 in the loading position the hoist (not shown) is attached to the eye 26 of the body 12 and to the structure 204, e.g., a utility pole, and the bail wire 100 of the clamp assembly 10 is mounted to a hook 202 attached to the structure 204, as seen in FIG. 2. The technician then hoists the self-supporting fiber optic cable 200, as is known, to position the cable for insertion into the clamp assembly 10, and inserts the self-supporting fiber optic cable 200 into the opening between the jaw members 30 and 50, seen in FIG. 17. The jaw members 30 and 50 are then released so that the stored energy of the spring 76 is released moving the jaw members into the clamping position where the fiber optic cable 200 is clamped between the jaw members 30 and 50, as seen in FIGS. 2 and 3. More specifically, to release the jaw members 30 and 50 from the loading position, the technician applies pressure to the pull arm 38 in the direction of the narrow width of the body 12 to move the jaw member 30 in the same direction, as seen by the arrow in FIG. 19. As the jaw member 30 moves in the direction of the arrow, a side edge 80*a* of the second platform portion 80 rides along the beveled side wall 48*b* of the notch 48*a*, as seen in FIG. 19. When the side edge 80*a* of the second platform portion 80 ceases to contact the side wall 48*b* of the notch 48*a* the force holding the jaw members 30 and 50 in the loading position is released such that the compression load on the spring 76 is released causing the jaw members 30 and 50 to move toward each other as spring 76 moves the floater 72 and thus the jaw members 30 and 50 toward the clamping position, as seen in FIG. 20. When the spring 76 fully decompresses, the jaw members 30 and 50 are in the clamping position, seen in FIGS. 2 and 3. The hoist is then disconnected from the clamp assembly 10 and the tension on the self-supporting fiber optic cable 200 tightly clamps the cable to the clamp assembly 10

Figure 21:
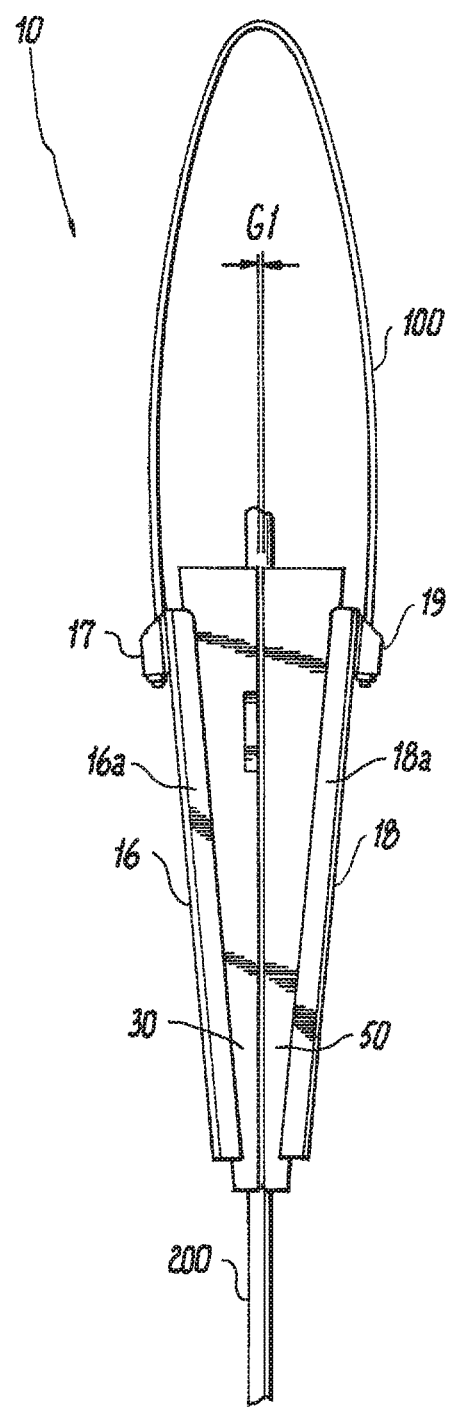
FIG. 21 is a top plan view of the cable clamp assembly of FIG. 2 having a fiber optic cable clamped thereto, illustrating the clamp in a clamping position and a gap between the pair of jaw members of the cable clamp assembly.
Figure 22:
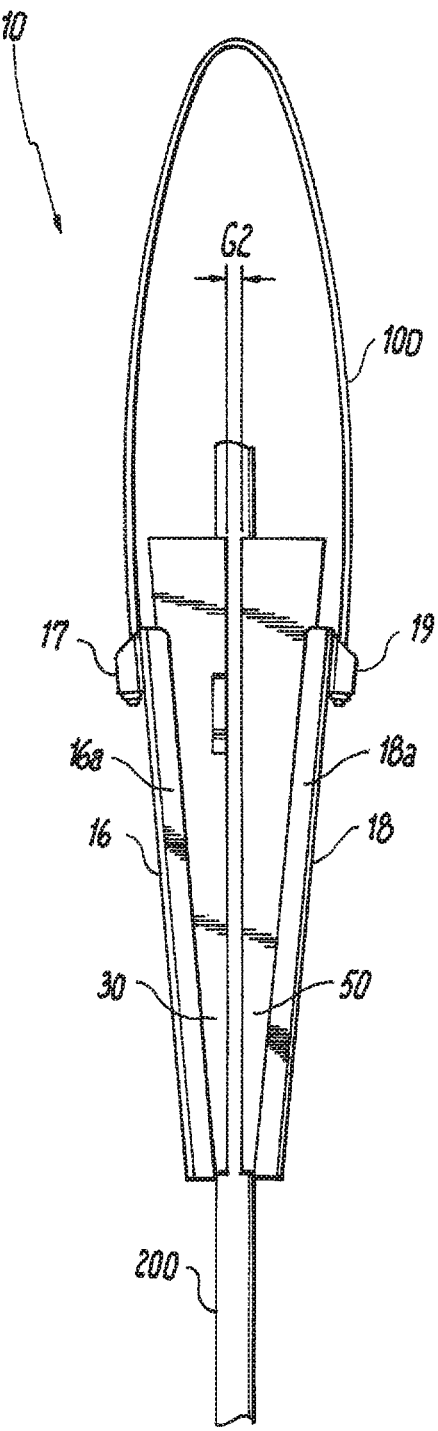
FIG. 22 is a top plan view of the cable clamp assembly of FIG. 2 having a larger diameter fiber optic cable clamped thereto, illustrating the clamp in the clamping position and a larger gap between the pair of jaw members of the dead-end cable clamp assembly.

It is noted that the clamping position for the jaw members 30 and 50 may vary depending upon the outside diameter of the fiber optic cable 200 being clamped. In the exemplary embodiment of FIG. 21, the fiber optic cable has an outside diameter of, for example, 0.71 inches. In the exemplary embodiment of FIG. 22, the fiber optic cable 200 has an outside diameter of, for example, 1.1 inches. As can be seen in FIGS. 21 and 22, the gap "G1" between the jaw members 30 and 50 is smaller than the gap "G2" between the jaw members.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A dead-end cable clamp comprising:
a body having a jaw receiving cavity;
a first jaw member slidably positioned within the jaw receiving cavity;
a second jaw member slidably positioned within the jaw receiving cavity; and
jaw actuator assembly centrally positioned within the jaw receiving cavity between the body and a bottom surface of each of the first and second jaw members, the jaw actuator assembly being operatively coupled to the bottom surfaces of the first and second jaw members so that the first and second jaw members move at substantially the same time between a loading position and a clamping position, and so that when in the loading position the jaw actuator assembly holds the first and second jaw members in the loading position until pressure is applied to at least one of the first jaw member and the second jaw member to cause the jaw actuator assembly to release the first and second jaw members permitting the first and second jaw members to move to the clamping position.

2. The cable clamp according to claim 1, further comprising a bail wire having each end coupled to the body.

3. The cable clamp according to claim 1, wherein the body is tapered.

4. The cable clamp according to claim 1, wherein at least a portion of the body and the jaw receiving cavity form a first jaw guide, and at least another portion of the body and the jaw receiving cavity form a second jaw guide.

5. The cable clamp according to claim 4, wherein the first jaw guide is provided to guide movement of the first jaw member relative to the body and to hold the first jaw member captive within the body when the clamp is in use, and wherein the second jaw guide is provided to guide the movement of the second jaw member relative to the body and to hold the second jaw member captive within the body when the clamp is in use.

6. The cable clamp according to claim 1, wherein the first jaw member includes a side wall having a first cable gripping surface, and wherein the second jaw member includes a side wall having a second cable gripping surface.

7. The cable clamp according to claim 6, wherein the first and second cable gripping surfaces comprise at least one of teeth, knurling and dimples.

8. The cable clamp according to claim 1, wherein the jaw actuator assembly automatically moves the first and second jaw members at substantially the same time from the loading position to the clamping position and applies sufficient gripping force on the cable to hold the cable.

9. A dead-end cable clamp comprising:
a body having a jaw receiving cavity, the body having a first width at a first end of the body and a second width at a second end of the body, the second width being greater than the first width;
a first jaw member slidably positioned within the jaw receiving cavity;
a second jaw member slidably positioned within the jaw receiving cavity;
jaw actuator assembly centrally positioned within the jaw receiving cavity between the body and a bottom surface of each of the first and second jaw members, the jaw actuator assembly being operatively coupled to the bottom surfaces of the first and second jaw members so that the first and second jaw members can move at substantially the same time between a loading position and a clamping position, and so that when in the loading position the jaw actuator assembly holds the first and second jaw members in the loading position until pressure is applied to at least one of the first jaw member and the second jaw member to cause the jaw actuator assembly to release the first and second jaw members permitting first and second jaw members to move to the clamping position; and
a bail wire having each end coupled to the second end of the body.

10. The cable clamp according to claim 9, wherein at least a portion of the body and the jaw receiving cavity form a first jaw guide, and at least another portion of the body and the jaw receiving cavity form a second jaw guide.

11. The cable clamp according to claim 10, wherein the first jaw guide is provided to guide movement of the first jaw member relative to the body and to hold the first jaw member captive within the body when the clamp is in use, and wherein the second jaw guide is provided to guide the movement of the second jaw member relative to the body and to hold the second jaw member captive within the body when the clamp is in use.

12. The cable clamp according to claim 9, wherein the first jaw member includes a side wall having a first cable gripping surface, and wherein the second jaw member includes a side wall having a second cable gripping surface.

13. The cable clamp according to claim 12, wherein the first and second cable gripping surfaces comprise at least one of teeth, knurling and dimples.

14. The cable clamp according to claim 9, wherein the jaw actuator assembly automatically moves the first and second jaw members at substantially the same time from the loading position to the clamping position and applies sufficient gripping force on the cable to hold the cable within the body.

15. A dead-end cable clamp comprising:
a body having a jaw receiving cavity;
a first jaw member slidably positioned within the jaw receiving cavity;
a second jaw member slidably positioned within the jaw receiving cavity; and
jaw actuator assembly centrally positioned within the jaw receiving cavity between the body and a bottom surface of each of the first and second jaw members, the jaw actuator assembly being operatively coupled to the bottom surfaces of the first and second jaw members so that the first and second jaw members automatically move at substantially the same time between a loading position and a clamping position, and so that when in the loading position the jaw actuator assembly holds the first and second jaw members in the loading position until pressure is applied to at least one of the first jaw member and the second jaw member to cause the jaw actuator assembly to release the first and second jaw members permitting first and second jaw members to move to the clamping position where the first and second jaw members apply a gripping force on the cable to hold the cable within the body.

16. The cable clamp according to claim 15, further comprising a bail wire having each end coupled to the body.

17. The cable clamp according to claim 15, wherein the body is tapered.

18. The cable clamp according to claim 15, wherein at least a portion of the body and the jaw receiving cavity form a first jaw guide, and at least another portion of the body and the jaw receiving cavity form a second jaw guide.

19. The cable clamp according to claim 18, wherein the first jaw guide is provided to guide movement of the first jaw member relative to the body and to hold the first jaw member captive within the body when the clamp is in use, and wherein the second jaw guide is provided to guide the movement of the second jaw member relative to the body and to hold the second jaw member captive within the body when the clamp is in use.

20. The cable clamp according to claim 15, wherein the first jaw member includes a side wall having a first cable gripping surface, and wherein the second jaw member includes a side wall having a second cable gripping surface.

21. The cable clamp according to claim 20, wherein the first and second cable gripping surfaces comprise at least one of teeth, knurling and dimples.

\* \* \* \* \*